(12) United States Patent
Liu

(10) Patent No.: US 11,050,665 B2
(45) Date of Patent: Jun. 29, 2021

(54) DATA TRANSMISSION METHOD, APPARATUS, TRANSMITTING END, RECEIVING END AND SYSTEM

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 91 days.

(21) Appl. No.: 16/515,459

(22) Filed: Jul. 18, 2019

(65) Prior Publication Data

US 2019/0349296 A1  Nov. 14, 2019

Related U.S. Application Data

(63) Continuation of application No. PCT/CN2017/075045, filed on Feb. 27, 2017.

(30) Foreign Application Priority Data

Jan. 20, 2017 (WO) ................ PCT/CN2017/071850

(51) Int. Cl.
*H04L 12/741* (2013.01)
(52) U.S. Cl.
CPC .................. *H04L 45/74* (2013.01)
(58) Field of Classification Search
None
See application file for complete search history.

(56) References Cited

U.S. PATENT DOCUMENTS

| 8,432,888 B2 * | 4/2013 | Sakoda ................ H04L 47/14 370/349 |
| 2005/0213605 A1 | 9/2005 | Kim et al. |

(Continued)

FOREIGN PATENT DOCUMENTS

| CN | 1914879 A | 2/2007 |
| CN | 101166193 A | 4/2008 |

(Continued)

OTHER PUBLICATIONS

Extended European Search Report dated Sep. 18, 2019 Appln. No. 17892405.6.

(Continued)

*Primary Examiner* — Ayaz R Sheikh
*Assistant Examiner* — Faiyazkhan Ghafoerkhan

(57) ABSTRACT

An apparatus, a transmitting end, a receiving end and a system are provided. The method includes: generating a data packet of a preset format according to n data units and attribute information of each data unit, where the attribute information includes transmission channel information and a data length of the each data unit, n≥2; and transmitting the data packet to a receiving end, where the data packet includes header information and the n data units, and at least one piece of the header information is generated according to same information in attribute information of at least two of the data units. Since at least one piece of header information is generated according to the same information in the attribute information of at least two data units, that is, the transmitting end can omit, in the header information, the same information in the attribute information.

17 Claims, 6 Drawing Sheets

(56) References Cited

U.S. PATENT DOCUMENTS

| | | | | |
|---|---|---|---|---|
| 2008/0219291 | A1* | 9/2008 | Obuchi | H04L 1/1887 |
| | | | | 370/469 |
| 2008/0226074 | A1* | 9/2008 | Sammour | H04W 12/033 |
| | | | | 380/270 |
| 2008/0298322 | A1* | 12/2008 | Chun | H04L 1/1635 |
| | | | | 370/335 |
| 2009/0059891 | A1* | 3/2009 | Sakoda | H04L 43/0894 |
| | | | | 370/348 |
| 2009/0185477 | A1* | 7/2009 | Lee | H04L 47/34 |
| | | | | 370/216 |
| 2013/0044698 | A1* | 2/2013 | Susitaival | H04W 28/06 |
| | | | | 370/329 |
| 2017/0288821 | A1* | 10/2017 | Baek | H04L 1/1635 |
| 2018/0146467 | A1* | 5/2018 | Kim | H04W 28/065 |
| 2018/0176344 | A1* | 6/2018 | Yang | H04L 69/324 |

FOREIGN PATENT DOCUMENTS

| | | |
|---|---|---|
| CN | 101911630 A | 12/2010 |
| CN | 102711268 A | 10/2012 |
| CN | 101911630 B | 3/2013 |
| CN | 105282114 A | 1/2016 |
| CN | 103078919 B | 3/2016 |
| EP | 1700455 B1 | 7/2011 |
| JP | 2007522780 A | 8/2007 |
| JP | 2008503146 A | 1/2008 |
| JP | 2008503174 A | 1/2008 |
| JP | 2010166564 A | 7/2010 |
| KR | 20160070740 A | 6/2016 |
| WO | 2009079854 A1 | 7/2009 |

OTHER PUBLICATIONS

International Search Report (ISR) dated Oct. 25, 2017 for Application No. PCT/CN2017/075045.
International Search Report (ISR) dated Sep. 27, 2017 for Application No. PCT/CN2017/071850.
3GPP TS 36.331 V13.0.0 (Dec. 2015); 3rd Generation Partnership Project;Technical Specification Group Radio Access Network; Evolved Universal Terrestrial Radio Access (E-UTRA); Radio Resource Control (RRC); Protocol specification (Release 13).
3GPP TS 36.321 V13.0.0 (Dec. 2015); 3rd Generation Partnership Project; Technical Specification Group Radio Access Network;Evolved Universal Terrestrial Radio Access (E-UTRA); Medium Access Control (MAC) protocol specification (Release 13).
The First Office Action of corresponding European application No. 17892405.6, dated Oct. 29, 2020.
The First Office Action of corresponding Indian application No. 201917033129, dated Dec. 18, 2020.
The First Office Action of corresponding Japanese application No. 2019-538656, dated Feb. 2, 2021.
The First Office Action of corresponding Chinese application No. 201780084180.8, dated Mar. 26, 2021.

* cited by examiner

| LCID=1 L=1000bit k=3 | LCID=2 L=2000bit k=1 | Data unit | Data unit | Data unit | Data unit |

FIG. 6

| Data unit | Data unit | Data unit | Data unit | LCID=1 L=1000bit k=3 | LCID=2 L=2000bit k=1 |

FIG. 7

| Flag=1 LCID=1 L=1000bit s=3 | Data unit | Data unit | Data unit | Flag=0 L=2000bit s=1 | Data unit |

FIG. 8

| Flag=1 LCID=1 L=3000bit s=3 | Data unit | Data unit | Data unit | Flag=0 L=2000bit s=1 | Data unit |

FIG. 9

| Flag=1 LCID=1 L=1000bit s=3 | Data unit | Data unit | Data unit | Flag=0 L=2000bit s=1 | Data unit | Flag=2 LCID=2 s=1 | Data unit |

FIG. 10

| Flag=1 LCID=1 L=1000bit s=3 | Flag=0 L=2000bit s=1 | Data unit | Data unit | Data unit | Data unit |

FIG. 11

| Data unit | Data unit | Data unit | Data unit | Flag=0 L=2000bit s=1 | Flag=1 LCID=1 L=1000bit s=3 |

FIG. 12

| Flag=1 Flag=0 | LCID=1 L=1000bit s=3 | Data unit | Data unit | Data unit | L=2000bit s=1 | Data unit |

FIG. 13

| Flag=1 LCID=1 L=1000bit | Data unit | Flag=0 L=2000bit | Data unit | Flag=0 L=2000bit | Data unit |

FIG. 14

| Flag=1 LCID=1 L=1000bit | Data unit | Flag=0 LCID=2 | Data unit | Flag=0 LCID=2 | Data unit |

FIG. 15

| Flag=1 LCID=1 L=1000bit | Flag=0 L=2000bit | Flag=0 L=2000bit | Data unit | Data unit | Data unit |

FIG. 16

| Data unit | Data unit | Data unit | Flag=0 L=2000bit | Flag=0 L=2000bit | Flag=1 LCID=1 L=1000bit |

FIG. 17

| Flag=1 Flag=0 Flag=0 | LCID=1 L=1000bit | Data unit | L=2000bit | Data unit | L=2000bit | Data unit |
FIG. 18
| Flag=1 LCID=1 L=1000bit | Data unit | Flag=0 | Data unit | Flag=0 | Data unit |
FIG. 19
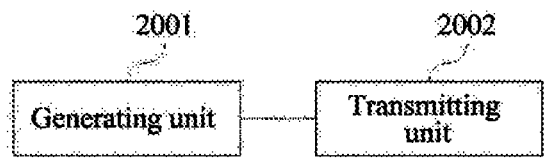
FIG. 20
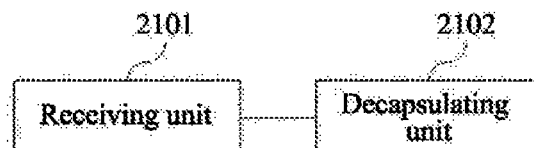
FIG. 21

DATA TRANSMISSION METHOD, APPARATUS, TRANSMITTING END, RECEIVING END AND SYSTEM

CROSS-REFERENCE TO RELATED APPLICATIONS

This application is a continuation of International Application No. PCT/CN2017/075045, filed on Feb. 27, 2017, which claims the priority to PCT Patent Application No. PCT/CN2017/071850, filed on Jan. 20, 2017, which are hereby incorporated by reference in their entireties.

TECHNICAL FIELD

Embodiments of the present disclosure relate to the field of communications, and in particular, to a data transmission method, an apparatus, a transmitting end, a receiving end, and a system.

BACKGROUND

In a 5th generation mobile communication (5G) system, when there is data to be transmitted, a transmitting end encapsulates the data into a data packet sequentially based on protocols of a Packet Data Convergence Protocol (PDCP) layer, a Radio Link Control (RLC) layer, a Medium Access Control (MAC) layer, etc., and then transmits the data packet on a physical link.

Specifically, the data to be transmitted is a PDCP Service Data Unit (SDU). The transmitting end adds a PDCP header before the PDCP SDU according to the PDCP layer protocol to encapsulate the PDCP SDU into a PDCP PDU; adds an RLC header before the PDCP PDU according to the RLC layer protocol to encapsulate the PDCP PDU into an RLC PDU; then adds a MAC sub-header before the RLC PDU according to the MAC layer protocol to encapsulate the RLC PDU into a MAC sub-PDU; and finally combines MAC sub-PDUs into a MAC PDU as an encapsulated packet.

Each MAC sub-PDU includes a MAC sub-header, and each MAC sub-header includes at least a Logical Channel Identity (LCID) and a data length L of the RLC PDU, resulting in a large overhead of the MAC PDU.

SUMMARY

In order to solve the problem that each MAC sub-PDU includes a MAC sub-header, and each MAC sub-header includes at least an LCID and the data length L, which results in a large overhead of a MAC PDU, embodiments of the present disclosure provide a data transmission method, an apparatus, a transmitting end, a receiving end and a system. The technical solutions are as follows.

According to a first aspect of embodiments of the present disclosure, a data transmission method is provided, where the method includes:

generating a data packet of a preset format according to n data units and attribute information of each data unit, where the attribute information includes transmission channel information and a data length of the each data unit, $n \geq 2$; and transmitting the data packet to a receiving end, where the data packet includes header information and the n data units, and at least one piece of the header information is generated according to same information in attribute information of at least two of the data units.

In an optional embodiment, the data packet includes m data unit sets, each data unit set includes one piece of header information and k data units corresponding to the header information, where attribute information of the k data units is the same, and a sum of all data unit quantities k is n; $m \geq 1$, $k \geq 1$;

where the header information includes transmission channel information of a data unit in the each data unit set, data length information, and a data unit quantity k in the each data unit set, where the data length information is a data length of one of the data units or a total data length of the k data units.

In an optional embodiment, the m data unit sets are cascaded, and the header information in each data unit set is located before the k data units corresponding to the header information;

or, m pieces of the header information are cascaded, the n data units are cascaded, and the cascaded header information is located before or after the cascaded data units.

In an optional embodiment, the data packet includes i data unit sets, each data unit set includes j data unit subsets, each data unit subset includes one piece of header information and s data units corresponding to the header information, where attribute information of the data units in a same data unit subset is the same, attribute information of data units in different data unit subsets is partially the same, and a sum of all data unit quantities s is n; $i \geq 1$, $j \geq 2$, $s \geq 1$;

where one of j pieces of header information included in each data unit set includes a first identifier, the transmission channel information, data length information and a data unit quantity s, and each of the rest pieces of the head information included in the each data unit set includes a second identifier, difference information and a data unit quantity s, where the data length information is a data length of one of the data units or a total data length of the s data units;

the first identifier in the header information is used to indicate that the header information includes the transmission channel information and the data length information;

the second identifier in the header information is used to indicate that the header information includes the difference information;

where the difference information is determined according to different information in attribute information of data units in different data unit subsets in a same data unit set.

In an optional embodiment, the data packet includes i data unit sets, each data unit set includes j data unit subsets, each data unit subset includes one piece of header information and s data units corresponding to the header information, where attribute information of the data units in a same data unit subset is the same, attribute information of data units in different data unit subsets is partially the same, and a sum of all data unit quantities s is n; $i \geq 1$, $j \geq 2$, $s \geq 1$;

where one of j pieces of header information included in each data unit set includes a first identifier, the transmission channel information, data length information and a data unit quantity s, and each of the rest pieces of the head information included in the each data unit set includes a second identifier and difference information, where the data length information is a data length of one of the data units or a total data length of the s data units;

the first identifier in the header information is used to indicate that the header information includes the transmission channel information, the data length information and the data unit quantity s; the second identifier in the header information is used to indicate that the header information includes the difference information;

where the difference information is determined according to different information in data unit quantities s and attribute information of data units in different data unit subsets in a same data unit set.

In an optional embodiment, the i data unit sets are cascaded, the j data unit subsets are cascaded, and the header information in each data unit subset is located before the s data units corresponding to the header information;

or, q pieces of the header information are cascaded, the n data units are cascaded, and the cascaded header information is located before or after the cascaded data units, where q is a sum of data unit subset quantities j for the i data unit sets.

In an optional embodiment, the data packet includes packet head information and i data unit sets, each data unit set includes j data unit subsets, each data unit subset includes one piece of header information and s data units corresponding to the header information, where attribute information of the data units in a same data unit subset is the same, attribute information of data units in different data unit subsets is partially the same, and a sum of all data unit quantities s is n; i≥1, j≥2, s≥1;

where one of j pieces of header information included in each data unit set includes the transmission channel information, data length information and a data unit quantity s, and each of the rest pieces of the head information included in the each data unit set includes difference information and a data unit quantity s, where the data length information is a data length of one of the data units or a total data length of the s data units;

where the packet head information includes a first flag bit, where the first flag bit is used to indicate that each piece of header information includes the transmission channel information and the data length information, or the first flag bit is used to indicate that each piece of header information includes the difference information;

where the difference information is determined according to different information in attribute information of data units in different data unit subsets in a same data unit set.

In an optional embodiment, the data packet includes packet head information and i data unit sets, each data unit set includes j data unit subsets, each data unit subset includes one piece of header information and s data units corresponding to the header information, where attribute information of the data units in a same data unit subset is the same, attribute information of data units in different data unit subsets is partially the same, and a sum of all data unit quantities s is n; i≥1, j≥2, s≥1;

where one of j pieces of header information included in each data unit includes the transmission channel information, data length information and a data unit quantity s, and each of the rest pieces of the head information included in the each data unit includes difference information, where the data length information is a data length of one of the data units or a total data length of the s data units;

where the packet head information includes a first flag bit, where the first flag bit is used to indicate that each piece of header information includes the transmission channel information, the data length information and the data unit quantity s, or, the first flag bit is used to indicate that each piece of header information includes the difference information;

where the difference information is determined according to different information in data unit quantities s and attribute information of data units in different data unit subsets in a same data unit set.

In an optional embodiment, the i data unit sets are cascaded, the j data unit subsets are cascaded, the header information in each data unit subset is located before the s data units corresponding to the header information, and the packet head information is located before or after the cascaded data unit sets;

or, q pieces of the header information are cascaded, the n data units are cascaded, the cascaded header information is located before or after the cascaded data units, and the packet head information is located before the cascaded header information or after the cascaded data units, where q is a sum of data unit subset quantities j for the i data unit sets.

In an optional embodiment, the data packet includes i data unit sets, each data unit set includes j data unit subsets, each data unit subset includes one piece of header information and one data unit corresponding to the header information, where attribute information of data units in different data unit subsets is partially the same, and a total quantity of data units is n; i≥1, j≥2;

where one of j pieces of header information included in each data unit set includes a first identifier, the transmission channel information and the data length, and each of the rest pieces of the head information included in the each data unit set includes a second identifier and difference information;

where the first identifier in the header information is used to indicate that the header information includes the transmission channel information and the data length; the second identifier in the header information is used to indicate that the header information includes the difference information;

where the difference information is determined according to different information in attribute information of data units in different data unit subsets in a same data unit set.

In an optional embodiment, the data packet includes packet head information and i data unit sets, each data unit set includes j data unit subsets, each data unit subset includes one piece of header information and one data unit corresponding to the header information, where attribute information of data units in different data unit subsets is partially the same, and a total quantity of data units is n; i≥1, j≥2;

where one of j pieces of header information included in each data unit set includes the transmission channel information and the data length, and each of the rest pieces of the head information included in the each data unit set includes difference information;

where the packet head information includes a first flag bit, where the first flag bit is used to indicate that each piece of header information includes the transmission channel information and the data length, or, the first flag bit is used to indicate that each piece of header information includes the difference information;

where the difference information is determined according to different information in attribute information of data units in different data unit subsets in a same data unit set.

In an optional embodiment, the i data unit sets are cascaded, the j data unit subsets are cascaded, the header information in each data unit subset is located before the one data unit corresponding to the header information, and the packet head information is located before or after the cascaded data unit sets;

or, n pieces of the header information are cascaded, the n data units are cascaded, the cascaded header information is located before or after the cascaded data units, and the packet head information is located before the cascaded header information or after the cascaded data units.

In an optional embodiment, the data packet includes i data unit sets, each data unit set includes j data unit subsets, each data unit subset includes one piece of header information and one data unit corresponding to the header information, where attribute information of data units in a same data unit set is the same, and a total quantity of data units is n; i≥1, j≥2;

where one of j pieces of header information included in each data unit set includes a first identifier, the transmission channel information and the data length, and each of the rest pieces of the head information included in the each data unit set includes a third identifier;

where the first identifier in the header information is used to indicate that the header information includes the transmission channel information and the data length; the third identifier in the header information is used to indicate that the header information does not include the transmission channel information and the data length.

In an optional embodiment, the i data unit sets are cascaded, the j data unit subsets are cascaded, and the header information in each data unit subset is located before the one data unit corresponding to the header information;

or, n pieces of the header information are cascaded, the n data units are cascaded, and the cascaded header information is located before or after the cascaded data units.

In an optional embodiment, the cascaded header information is located before the cascaded data unit sets, and the data packet further includes packet head information, the packet head information includes an initial location of a first piece of header information, and a length of each piece of header information is preset, or, the packet head information includes an initial location of a first piece of header information and a length of each piece of header information, where each piece of header information further includes a second flag bit, the second flag bit is used to indicate that what is encapsulated in a data block immediately after the header information is header information, or, the second flag bit is used to indicate that what is encapsulated in a data block immediately after the header information is a data unit;

or, the packet head information includes an initial location of a first piece of header information and a quantity of piece of head information, and a length of each piece of header information is preset, or, the packet head information includes an initial location of a first piece of header information, a quantity of piece of head information and a length of each piece of header information;

or, the packet head information includes an initial location of a first piece of header information and an end location of a last piece of header information, and a length of each piece of header information is preset, or, the packet head information includes an initial location of a first piece of header information, an end location of a last piece of header information and a length of each piece of header information;

or, the packet head information includes an initial location and a third flag bit of each data block, where the third flag bit is used to indicate that what is encapsulated in the each data block is header information, or, the third flag bit is used to indicate that what is encapsulated in the each data block is a data unit.

In an optional embodiment, the cascaded header information is located after the cascaded data unit sets, and the data packet further includes packet head information, the packet head information includes a preset location, and a length of each piece of header information is preset, or, the packet head information includes a preset location and a length of each piece of header information, where the preset location is an initial location or an end location of a last piece of header information, and the header information further includes a fourth flag bit, where the fourth flag bit is used to indicate that what is encapsulated in a data block immediately before the header information is header information, or, the fourth flag bit is used to indicate that what is encapsulated in a data block immediately before the header information is a data unit;

or, the packet head information includes a preset location and a quantity of piece of header information, and a length of each piece of header information is preset, or, the packet head information includes a preset location, a quantity of piece of header information and a length of each piece of header information, where the preset location is an initial location or an end location of a last piece of header information;

or, the packet head information includes an initial location of a first piece of header information and an end location of a last piece of header information, and a length of each piece of header information is preset, or, the packet head information includes an initial location of a first piece of header information, an end location of a last piece of header information and a length of each piece of header information;

or, the packet head information includes an initial location and a fifth flag bit of each data block, where the fifth flag bit is used to indicate that what is encapsulated in the each data block is header information; or, the fifth flag bit is used to indicate that what is encapsulated in the each data block is a data unit.

In an optional embodiment, the generating a data packet of a preset format according to n data units and attribute information of each data unit includes:

generating the data packet of the preset format according to then data units and the attribute information of each data unit, when preset information in attribute information of the n data units is a preset value.

In an optional embodiment, the data packet further includes packet head information, where a sixth flag bit is provided in the packet head information, and the sixth flag bit is used to indicate whether the data packet is of the preset format.

According to a second aspect of embodiments of the present disclosure, a data transmission method is provided, where the method includes:

receiving a data packet of a preset format transmitted by a transmitting end, where the data packet includes header information and n data units, and at least one piece of the header information is generated according to same information in attribute information of at least two of the data units, where the attribute information includes transmission channel information and a data length of a data unit, n≥2; and decapsulating the data packet.

In an optional embodiment, the data packet includes in data unit sets, each data unit set includes one piece of header information and k data units corresponding to the header information, where attribute information of the k data units is the same, and a sum of all data unit quantities k is n; m≥1, k≥1;

where the decapsulating the data packet includes:

reading, for each data unit set, the header information in the each data unit set; and decapsulating the data units in the data unit sets according to the transmission channel information, data length information and a data unit quantity k in the header information, where the data length information is a data length of one of the data units or a total data length of the k data units.

In an optional embodiment, the reading, for each data unit set, the header information in the each data unit set includes:

reading the header information of each data unit set from an initial location of the each data unit set, when the m data unit sets are cascaded, and the header information in each data unit set is located before the k data units corresponding to the header information; and reading each piece of header information from a preset location of cascaded header information, when in pieces of the header information are cascaded, the n data units are cascaded, and the cascaded header information is located before or after the cascaded data units.

In an optional embodiment, the data packet includes i data unit sets, each data unit set includes j data unit subsets, each data unit subset includes one piece of header information and s data units corresponding to the header information, where attribute information of the data units in a same data unit subset is the same, attribute information of data units in different data unit subsets is partially the same, and a sum of all data unit quantities s is n; i≥1, j≥2, s≥1;

where the decapsulating the data packet includes:

reading, for each data unit set, the header information in each data unit subset in the each data unit set;

decapsulating, for each piece of first header information, the data units corresponding to the first header information according to the transmission channel information, data length information and a data unit quantity s which are read from the first header information, when the first header information includes a first identifier and the first identifier is used to indicate that the first header information includes the transmission channel information and the data length information; where the data length information is a data length of one of the data units or a total data length of the s data units; and decapsulating, for each piece of second header information, the data units corresponding to the second header information according to difference information and a data unit quantity s which are read from the second header information, as well as the first header information including the first identifier, when the second header information includes a second identifier and the second identifier is used to indicate that the second header information includes the difference information; where the difference information is determined according to different information in attribute information of data units in different data unit subsets in a same data unit set.

In an optional embodiment, the data packet includes i data unit sets, each data unit set includes j data unit subsets, each data unit subset includes one piece of header information and s data units corresponding to the header information, where attribute information of the data units in a same data unit subset is the same, attribute information of data units in different data unit subsets is partially the same, and a sum of all data unit quantities s is n; i≥1, j≥2, s≥1;

where the decapsulating the data packet includes:

reading, for each data unit set, the header information in each data unit subset in the each data unit set;

decapsulating, for each piece of first header information, the data units corresponding to the first header information according to the transmission channel information, data length information and a data unit quantity s which are read from the first header information, when the first header information includes a first identifier and the first identifier is used to indicate that the first header information includes the transmission channel information, the data length information and the data unit quantity s; where the data length information is a data length of one of the data units or a total data length of the s data units; and decapsulating, for each piece of second header information, the data units corresponding to the second header information according to difference information read from the second header information as well as the first header information including the first identifier, when the second header information includes a second identifier and the second identifier is used to indicate that the second header information includes the difference information; where the difference information is determined according to different information in data unit quantities s and attribute information of data units in different data unit subsets in a same data unit set.

In an optional embodiment, the reading, for each data unit set, the header information in each data unit subset in the each data unit set includes:

reading the header information of each data unit subset from an initial location of the each data unit subset, when the i data unit sets are cascaded, the j data unit subsets are cascaded, and the header information in the each data unit subset is located before the s data units corresponding to the header information; and reading each piece of header information from a preset location of cascaded header information, when q pieces of the header information are cascaded, the n data units are cascaded, and the cascaded header information is located before or after the cascaded data units, where q is a sum of data unit subset quantities j for the i data unit sets.

In an optional embodiment, the data packet includes packet head information and i data unit sets, each data unit set includes j data unit subsets, each data unit subset includes one piece of header information and s data units corresponding to the header information, where attribute information of the data units in a same data unit subset is the same, attribute information of data units in different data unit subsets is partially the same, and a sum of all data unit quantities s is n; i≥1, j≥2, s≥1;

where the decapsulating the data packet includes:

reading a first flag bit corresponding to each piece of header information in the packet head information;

reading, for each data unit set, the header information in each data unit subset in the each data unit set;

decapsulating, for each piece of third header information, the data units corresponding to the third header information according to the transmission channel information, data length information and a data unit quantity s which are read from the third header information, when the first flag bit corresponding to the third header information indicates that the third header information includes the transmission channel information and the data length information; where the data length information is a data length of one of the data units or a total data length of the s data units; and decapsulating, for each piece of fourth header information, the data units corresponding to the fourth header information according to difference information and a data unit quantity s which are read from the fourth header information as well as the third header information corresponding to the first flag bit that is used to indicate that the third header information includes the transmission channel information and the data length information, when the first flag bit corresponding to the fourth header information indicates that the fourth header information includes the difference information; where the difference information is determined according to different information in attribute information of data units in different data unit subsets in a same data unit set.

In an optional embodiment, the data packet includes packet head information and i data unit sets, each data unit set includes j data unit subsets, each data unit subset includes one piece of header information and s data units corresponding to the header information, where attribute information of the data units in a same data unit subset is the same, attribute information of data units in different data unit subsets is partially the same, and a sum of all quantities s of data units for the j data unit subsets is n; i≥1, j≥2, s≥1;

where the decapsulating the data packet includes:

reading a first flag bit corresponding to each piece of header information in the packet head information;

reading, for each data unit set, the header information in each data unit subset in the each data unit set;

decapsulating, for each piece of third header information, the data units corresponding to the third header information according to the transmission channel information, data length information and a data unit quantity s which are read from the third header information, when the first flag bit corresponding to the third header information indicates that the third header information includes the transmission channel information, the data length information and the data unit quantity s; where the data length information is a data length of one of the data units or a total data length of the s data units; and decapsulating, for each piece of fourth header information, the data units corresponding to the fourth header information according to difference information read from the fourth header information as well as the third header information corresponding to the first flag bit that is used to indicate that the third header information includes the transmission channel information, the data length information and the data unit quantity s, when the first flag bit corresponding to the fourth header information indicates that the fourth header information includes the difference information; where the difference information is determined according to different information in data unit quantities s and attribute information of data units in different data unit subsets in a same data unit set.

In an optional embodiment, the reading, for each data unit set, the header information in each data unit subset in the each data unit set includes:

reading the header information in each data unit subset from an initial location of the each data unit subset, when the i data unit sets are cascaded, the j data unit subsets are cascaded, the header information in each data unit subset is located before the s data units corresponding to the header information, and the packet head information is located before or after the cascaded data unit sets; and reading each piece of header information from a preset location of cascaded header information, when q pieces, of the header information are cascaded, the n data units are cascaded, the cascaded header information is located before or after the cascaded data units, and the packet head information is located before the cascaded header information or after the cascaded data units, where q is a sum of data unit subset quantities j for the i data unit sets.

In an optional embodiment, the data packet includes i data unit sets, each data unit set includes j data unit subsets, each data unit subset includes one piece of header information and one data unit corresponding to the header information, where attribute information of data units in different data unit subsets is partially the same, and a total quantity of data units is n; i≥1, j≥2;

where the decapsulating the data packet includes:

reading, for each data unit set, the header information in each data unit subset in the each data unit set;

decapsulating, for each piece of first header information, the data unit corresponding to the first header information according to the transmission channel information and the data length which are read from the first header information, when the first header information includes a first identifier and the first identifier is used to indicate that the first header information includes the transmission channel information and the data length; and decapsulating, for each piece of second header information, the data unit corresponding to the second header information according to difference information read from the second header information as well as the first header information including the first identifier, when the second header information includes a second identifier and the second identifier is used to indicate that the second header information includes the difference information; where the difference information is determined according to different information in attribute information of data units in different data unit subsets in a same data unit set.

In an optional embodiment, the data packet includes packet head information and i data unit sets, each data unit set includes j data unit subsets, each data unit subset includes one piece of header information and one data unit corresponding to the header information, where attribute information of data units in different data unit subsets is partially the same, and a total quantity of data units is n; i≥1, j≥2;

where the decapsulating the data packet includes:

reading a first flag bit corresponding to each piece of header information in the packet head information;

reading, for each data unit set, the header information in each data unit subset in the each data unit set;

decapsulating, for each piece of third header information, the data unit corresponding to the third header information according to the transmission channel information and the data length which are read from the third header information, when the first flag bit corresponding to the third header information indicates that the third header information includes the transmission channel information and the data length; and decapsulating, for each piece of fourth header information, the data unit corresponding to the fourth header information according to difference information read from the fourth header information as well as the third header information corresponding to the first flag bit that is used to indicate that the third header information includes the transmission channel information and the data length, when the first flag bit corresponding to the fourth header information indicates that the fourth header information includes the difference information; where the difference information is determined according to different information in attribute information of data units in different data unit subsets in a same data unit set.

In an optional embodiment, the reading, for each data unit set, the header information in each data unit subset in the each data unit set includes:

reading the header information of each data unit subset from an initial location of the each data unit subset, when the i data unit sets are cascaded, the j data unit subsets are cascaded, the header information in each data unit subset is located before the one data unit corresponding to the header information, and the packet head information is located before or after the cascaded data unit sets;

reading each piece of header information from a preset location of cascaded header information, when n pieces of the header information are cascaded, the n data units are cascaded, the cascaded header information is located before or after the cascaded data units, and the packet head information is located before the cascaded header information or after the cascaded data units.

In an optional embodiment, where, the data packet includes i data unit sets, each data unit set includes j data unit subsets, each data unit subset includes one piece of header information and one data unit corresponding to the header information, attribute information of data units in different data unit subsets is the same, and a total quantity of data units is n; i≥1, j≥2;

where the decapsulating the data packet includes:

reading, for each data unit set, the header information in each data unit subset in the each data unit set;

decapsulating, for each piece of first header information, the data unit corresponding to the first header information according to the transmission channel information and the data length which are read from the first header information, when the first header information includes a first identifier and the first identifier is used to indicate that the first header information includes the transmission channel information and the data length; and decapsulating, for each piece of second header information, the data unit corresponding to the second header information according to the first header information including the first identifier, when the second header information includes a third identifier and the third identifier is used to indicate that the second header information does not include the transmission channel information and the data length.

In an optional embodiment, the reading, for each data unit set, the header information in each data unit subset in the each data unit set includes:

reading the header information of each data unit subset from an initial location of the each data unit subset, when the i data unit sets are cascaded, the j data unit subsets are cascaded, and the header information in each data unit subset is located before the one data unit corresponding to the header information; and reading each piece of header information from a preset location of cascaded header information, when n pieces of the header information are cascaded, the n data units are cascaded, and the cascaded header information is located before or after the cascaded data units.

In an optional embodiment, the cascaded header information is located before the cascaded data unit sets, and the data packet further includes packet head information, the reading each piece of header information from a preset location of cascaded header information includes:

reading an initial location of a first piece of header information in the packet head information, and sequentially reading each piece of header information from the initial location according to a preset length of each piece of header information or a length of each piece of header information in the packet head information, until it is determined according to a second flag bit in the header information that what is encapsulated in a data block immediately after the head information is a data unit;

or, reading an initial location of a first piece of header information in the packet head information, and sequentially reading each piece of header information from the initial location according to a preset length of each piece of header information or a length of each piece of header information in the packet head information, until a quantity of piece of the read header information reaches the quantity of piece of head information;

or, reading an initial location of a first piece of header information in the packet head information, and sequentially reading each piece of header information from the initial location according to a preset length of each piece of header information or a length of each piece of header information in the packet head information, until a read location is an end location of a last piece of header information;

or, reading an initial location and a third flag bit of each data block in the packet head information, and when the third flag bit indicates that what is encapsulated in a corresponding data block is header information, reading the header information.

In an optional embodiment, the cascaded header information is located after the cascaded data unit sets, and the data packet further includes packet head information, the reading each piece of header information from a preset location of cascaded header information includes:

reading a preset location in the packet head information, and sequentially reading each piece of header information from the preset location according to a preset length of each piece of header information or a length of each piece of header information in the packet head information, until it is determined according to a fourth flag bit in the header information that what is encapsulated in a data block immediately before the head information is a data unit. where the preset location is an initial location or an end location of a last piece of header information;

or, reading a preset location in the packet head information, and sequentially reading each piece of header information from the preset location according to a preset length of each piece of header information or a length of each piece of header information in the packet head information, until a quantity of piece of the read header information reaches the quantity of piece of head information, where the preset location is an initial location or an end location of a last piece of header information;

or, reading an initial location of a first piece of header information in the packet head information, and sequentially reading each piece of header information from the initial location according to a preset length of each piece of header information or a length of each piece of header information in the packet head information, until a read location is an end location of a last piece of header information;

or, reading an initial location and a fifth flag bit of each data block in the packet head information, and when the fifth flag bit indicates that what is encapsulated in a corresponding data block is header information, reading the header information.

In an optional embodiment, the receiving a data packet of a preset format transmitted by a transmitting end includes:

determining that the data packet of the preset format transmitted by the transmitting end is received, when preset information in attribute information of the n data units is a preset value.

In an optional embodiment, the data packet further includes packet head information, and the receiving a data packet of a preset format transmitted by a transmitting end includes:

reading a sixth flag bit in the packet head information, and determining, according to the sixth flag bit, whether the data packet of the preset format transmitted by the transmitting end is received.

According to a third aspect of embodiments of the present disclosure, a data transmission apparatus is provided, where the data transmission apparatus includes at least one unit, where the at least one unit is configured to implement the data transmission method according to the first aspect or any one of the optional implementations of the first aspect.

According to a fourth aspect of embodiments of the present disclosure, a data transmission apparatus is provided, where the data transmission apparatus includes at least one unit, where the at least one unit is configured to implement the data transmission method according to the second aspect or any one of the optional implementations of the second aspect.

According to a fifth aspect of embodiments of the present disclosure, a transmitting end is provided, where the transmitting end includes a processor, a memory, a transmitter and a receiver; where the processor is configured to store one or more instructions which are instructed to be executed by the processor, and the processor is configured to implement the data transmission method according to the first aspect or any one of the optional implementations of the first aspect; and the transmitter is configured to transmit a data packet.

According to a sixth aspect of embodiments of the present disclosure, a receiving end is provided, where the receiving end includes a processor, a memory, a transmitter and a receiver; where the processor is configured to store one or more instructions which are instructed to be executed by the processor, and the processor is configured to implement the data transmission method according to the second aspect or any one of the optional implementations of the second aspect; the receiver is configured to implement reception of a data packet.

According to a seventh aspect of embodiments of the present disclosure, a computer readable medium is provided, where the computer readable medium stores one or more instructions, and the instructions are used to implement the data transmission method according to the first aspect or any one of the optional implementations of the first aspect.

According to an eighth aspect of embodiments of the present disclosure, a computer readable medium is provided, where the computer readable medium stores one or more instructions, where the instructions are used to implement the data transmission method according to the second aspect or any one of the optional implementations of the second aspect.

According to a ninth aspect of embodiments of the present disclosure, a data transmission system is provided, where the data transmission system includes a transmitting end and a receiving end, where the transmitting end includes the data transmission apparatus according to the third aspect or any one of the optional implementations of the third aspect, and the receiving end includes the data transmission apparatus according to the fourth aspect or any one of the optional implementations of the fourth aspect.

According to a tenth aspect of embodiments of the present disclosure, a data transmission system is provided, where the data transmission system includes a transmitting end and a receiving end, where the transmitting end is the transmitting end according to the fifth aspect or any one of the optional implementations of the fifth aspect, and the receiving end is the receiving end according to the sixth aspect or any one of the optional implementations of the sixth aspect.

The beneficial effects of the technical solutions provided by the embodiments of the present disclosure are that:

since at least one piece of header information is generated according to the same information in the attribute information of at least two data units, that is, the transmitting end can omit, in the header information, the same information in the attribute information, thereby reducing redundant identical information, so that an effect of reducing the overhead of the MAC PDU is achieved.

BRIEF DESCRIPTION OF DRAWINGS

In order to more clearly illustrate technical solutions in embodiments of the present disclosure, accompanying drawings required for describing the embodiments will be briefly described below. Apparently, the accompanying drawings in the following description are some of the embodiments of the present disclosure, and other drawings can be obtained by those skilled in the art based on these accompanying drawings without any creative effort.

FIG. 6 is a schematic structural diagram of a third type of data packet according to an embodiment of the present disclosure;

FIG. 7 is a schematic structural diagram of a fourth type of data packet according to an embodiment of the present disclosure;

FIG. 8 is a schematic structural diagram of a fifth type of data packet according to an embodiment of the present disclosure;

FIG. 9 is a schematic structural diagram of a sixth type of data packet according to an embodiment of the present disclosure;

FIG. 10 is a schematic structural diagram of a seventh type of data packet according to an embodiment of the present disclosure;

FIG. 11 is a schematic structural diagram of an eighth type of data packet according to an embodiment of the present disclosure;

FIG. 12 is a schematic structural diagram of a ninth type of data packet according to an embodiment of the present disclosure;

FIG. 13 is a schematic structural diagram of a tenth type of data packet according to an embodiment of the present disclosure;

FIG. 14 is a schematic structural diagram of an eleventh type of data packet according to an embodiment of the present disclosure;

FIG. 15 is a schematic structural diagram of a twelfth type of data packet according to an embodiment of the present disclosure;

FIG. 16 is a schematic structural diagram of a thirteenth type of data packet according to an embodiment of the present disclosure;

FIG. 17 is a schematic structural diagram of a fourteenth type of data packet according to an embodiment of the present disclosure;

FIG. 18 is a schematic structural diagram of a fifteenth type of data packet according to an embodiment of the present disclosure;

FIG. 19 is a schematic structural diagram of a sixteenth type of data packet according to an embodiment of the present disclosure;

FIG. 20 is a structural block diagram of a data transmission apparatus according to another embodiment of the present disclosure;

FIG. 21 is a structural block diagram of a data transmission apparatus according to another embodiment of the present disclosure;

DESCRIPTION OF EMBODIMENTS

In order to make objects, technical solutions and advantages of the present disclosure clearer, embodiments of the present disclosure will be further described in detail below with reference to the accompanying drawings.

The term "module" as referred to herein generally refers to a program or instruction stored in a memory that is capable of performing certain functions; the term "unit" as referred to herein generally refers to a functional structure that is logically divided, the "unit" may be implemented by pure hardware or a combination of hardware and software.

The term "multiple" as referred to herein means two or more. The term "and/or" describes an association relationship of associated objects, indicating that there may be three kinds of relationship, for example, A and/or B may indicate the following three cases: only A exists, both of A and B exist, only B exists. The character "/" generally indicates that the contextual objects are in an "or" relationship.

Figure 1:
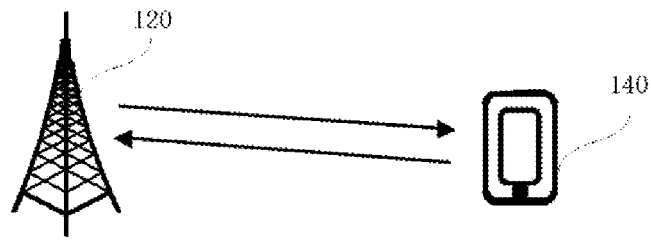
FIG. 1 is a schematic structural diagram of a mobile communication system according to an embodiment of the present disclosure.

Referring to FIG. 1, FIG. 1 illustrates a schematic structural diagram of a mobile communication system according to an embodiment of the present disclosure. The mobile communication system may be a 5G system, also known as a new radio (NR) system. The mobile communication system includes a transmitting end 120 and a receiving end 140.

The transmitting end 120 is a base station or a terminal, and the receiving end 140 is a base station or a terminal. A wireless connection is established between the transmitting end 120 and the receiving end 140 via a wireless air interface. In an embodiment, the wireless air interface is a wireless air interface based on the standard of the fifth generation mobile communication network technology (5G), for example, the wireless air interface is NR; or the wireless air interface may also be a wireless air interface based on the standard of a mobile communication network technology which is the next generation to 5G.

The base station may be a base station (gNB) employing a centralized-distributed architecture in a 5G system. When the transmitting end 120 adopts a centralized distributed architecture, the transmitting end 120 generally includes a central unit (CU) and at least two distributed units (DU). The central unit is provided with a protocol stack of a PDCP layer, an RLC layer, and a MAC layer, and the distributed unit is provided with a Physical (PHY) layer protocol stack. The specific implementation of the base station is not limited in embodiments of the present disclosure.

The terminal may be a device that provides voice and/or data connectivity to a user. The terminal may communicate with one or more core networks via a Radio Access Network (RAN), and the terminal may be a mobile terminal, such as a mobile phone (also referred to as "cellular" phone) and a computer with a mobile terminal, for example, a portable, a pocket, a handheld, a computer built-in or an in-vehicle mobile device. For example, the terminal may be a Subscriber Unit, a Subscriber Station, a Mobile Station, a Mobile, a Remote Station, an Access Point, and a Remote Terminal, an Access Terminal, a User Terminal, a User Agent, a User Device, or a User Equipment.

It should be noted that, multiple transmitting ends 120 and/or multiple receiving ends 140 may be included in the mobile communication system shown in FIG. 1. FIG. 1 illustrates an example in which there is one transmitting end 120 and one receiving end 140 with the transmitting end being a base station and the receiving end being a terminal, but this embodiment is not limited thereto.

Figure 2:
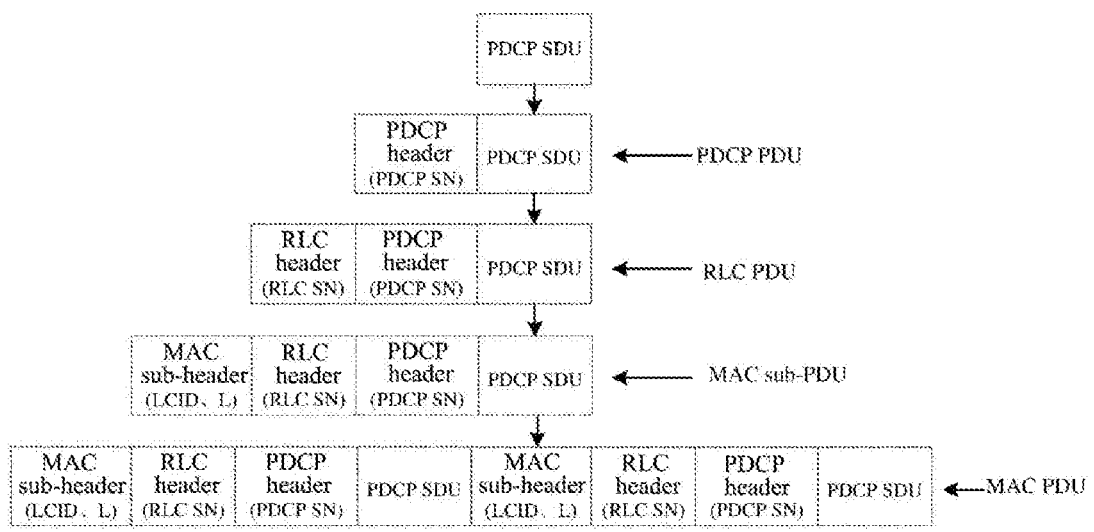
FIG. 2 is a schematic structural diagram of a MAC PDU in related art according to an embodiment of the present disclosure.

Referring to FIG. 2, which illustrates a schematic structural diagram of a MAC PDU in related art according to an embodiment of the present disclosure, FIG. 2 illustrates an example in which one MAC PDU includes two MAC sub-PDUs.

Each MAC sub-PDU includes one MAC sub-header and one RLC PDU, where the MAC sub-header includes an LCID and the data length L of the RLC PDU. The LCID is used to indicate a radio bearer corresponding to the RLC PDU, so that the receiving end transmits the RLC PDU to an upper layer entity corresponding to the radio bearer for processing.

Each RLC PDU includes one RLC header and one PDCP PDU. The RCL header includes at least an RLC Sequence Number (SN), where the RLC SN is used to identify a sequence number of the RLC PDU, so that the receiving end re-orders and re-detects the RLC PDU.

Each PDCP PDU includes one PDCD header and one PDCP SDU. The PDCP header includes at least a PDCP SN, where the PDCP SN is used to identify a sequence number of the PDCP PDU, so that the receiving end re-orders and re-detects the PDCP PDU. The PDCP SDU is the data to be transmitted.

When some RLC PDUs correspond to a same radio bearer, LCIDs in MAC sub-headers of those RLC PDUs are the same. At this time, the transmitting end may simplify the LCIDs in those MAC sub-headers, to reduce the number of bytes occupied by the LCIDs in those MAC sub-headers. Similarly, when data lengths of some RLC PDUs are the same, data lengths L in MAC sub-headers of those RLC PDUs are the same. At this time, the transmitting end may simplify the data lengths L in those MAC sub-headers, to reduce the number of bytes occupied by the data lengths L in those MAC sub-headers. The specific content of simplifying the MAC sub-header is described in detail in the following embodiments.

Figure 3:
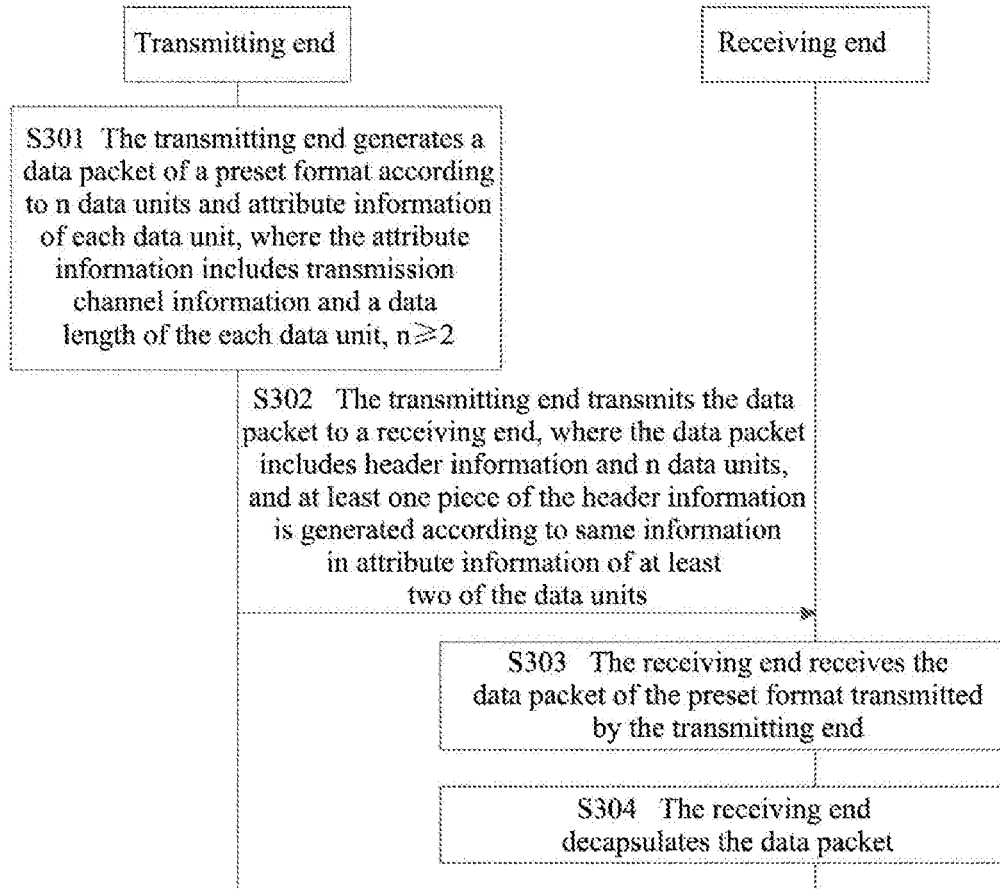
FIG. 3 is a flowchart of a data transmission method according to an embodiment of the present disclosure.

Referring to FIG. 3, FIG. 3 illustrates a flowchart of a data transmission method according to an embodiment of the present disclosure. This embodiment is exemplified by the data transmission method applied to the mobile communication system shown in FIG. 1. The method includes the following steps.

Step 301, the transmitting end generates a data packet of a preset format according to n data units and attribute information of each data unit, where the attribute information includes transmission channel information and a data length of the each data unit, n≥2.

The data unit is data acquired by an encapsulating entity of the transmitting end from an upper layer entity. The encapsulating entity is an entity for encapsulating a data packet. The encapsulating entity may be one of a MAC entity, an RLC entity and a PDCP entity, and may also be an entity in other layer, which is not limited in this embodiment. When the encapsulating entity is a MAC entity, the upper layer entity is an RLC entity; and when the encapsulating entity is an RLC entity, the upper layer entity is a PDCP entity.

The attribute information is information that is used to describe information of an attribute of the data unit. When the attribute of the data unit includes a transmitting channel, the attribute information includes transmission channel information. In this embodiment, the transmission channel information may be an RB ID of a radio bearer (RB) corresponding to the data unit, or, the transmission channel information may be an LCID of an LC corresponding to a radio bearer, which is not limited in this embodiment. When the attribute of the data unit includes a data length, the attribute information includes a data length L. Of course, the attribute information may include other information, which is not limited in this embodiment.

In a possible implementation, the encapsulating entity is a MAC entity, the data unit is an RLC PDU, and the attribute information includes an LCID and a data length L; or, the attribute information includes an RB ID and a data length L.

Since transmission channel information of some data units is the same and data lengths of some data units are the same, the transmitting end can generate the data packet of the preset format according to a preset encapsulation rule as well as the same transmission channel information and/or the same data length. The data packet of the preset format refers to a data packet generated using the method of this embodiment.

Step 302, the transmitting end transmits the data packet to a receiving end, where the data packet includes header information and n data units, and at least one piece of the header information is generated according to same information in attribute information of at least two of the data units.

The header information is information that is used to describe information of an attribute of the corresponding data unit. The encapsulating entity is still taken as a MAC entity for illustration, then the header information may be a MAC sub-header.

Data amount of the information for indicating the attribute information of the n data units in all the header information is smaller than the sum of the data amounts of the attribute information of the n data units.

When attribute information of at least two data units is the same, the transmitting end can use one piece of header information to describe the attribute information of the at least two data units, that is, one piece of header information corresponds to at least two data units, so that the effect of reducing the overhead of the MAC PDU is achieved by reducing the amount of the header information. Or, the transmitting end can use one piece of header information to describe attribute information of one data unit, and then indicates, by short information, that the rest header information is the same as the one piece of header information, so that the effect of reducing the overhead of MAC PDU is achieved by reducing the data amount of the header information. Where, data amount of one piece of the short information is less than data amount of one piece of header information indicated by that piece of the short information.

When attribute information of at least two data units is partially the same, the transmitting end can use one piece of header information to describe attribute information of one data unit, and then indicates, by short information, that the rest header information does not carry the same information as the one piece of header information, so that the effect of reducing the overhead of MAC PDU is achieved by reducing the data amount of the header information. Where, data amount of one piece of the short information is less than data amount of the same information indicated by that piece of the short information.

Step 303, the receiving end receives the data packet of the preset format transmitted by the transmitting end.

Step 304, the receiving end decapsulates the data packet.

The receiving end decapsulates the data packet of the preset format according to a decapsulation rule corresponding to the preset encapsulation rule.

It should be noted that, the steps performed by the transmitting end in this embodiment may be separately implemented as a data transmission method on the transmitting end side, and the steps performed by the receiving end in the above embodiments may be separately implemented as a data transmission method on the receiving end side.

In conclusion, in the data transmission method illustrated by this embodiment of the present disclosure, since at least one piece of header information is generated according to the same information in the attribute information of at least two data units, that is, the transmitting end can omit, in the header information, the same information in the attribute information, thereby reducing redundant identical information, so that an effect of reducing the overhead of the MAC PDU is achieved.

It should be noted that, the transmitting end also needs to determine whether to generate a data packet of a preset format, and correspondingly, the receiving end also needs to determine whether the decapsulated data packet is of the preset format.

In a first possible implementation, the transmitting end is notified through network configuration to generate a data packet of a preset format when a preset condition is met, and the receiving end is notified to decapsulate the data packet of the preset format when a preset condition is met. At this time, the step 301 may be replaced with: generating, according to n data units and attribute information of each data unit, a data packet of a preset format, when preset information in attribute information of the n data units is a preset value. Correspondingly, the step 303 may be replaced with: determining that the data packet of the preset format transmitted by the transmitting end is received, when the preset information in the attribute information of the n data units is the preset value.

For example, the preset condition is that a value of the transmission channel information is 1, then when the transmission channel information in the attribute information of the data unit is 1, the transmitting end generates the data packet of the preset format; and when the transmission channel information in the header information of the data packet received by the receiving end is 1, the receiving end decapsulates the data packet of the preset format.

In a second possible implementation, the transmitting end determines whether to generate a data packet of a preset format by itself and indicate the same in the data packet, so that the receiving end can determine whether to decapulate the data packet of the preset format. At this time, the data packet also includes packet head information, where a sixth flag bit, which is used to indicate whether the data packet is of the preset format, is set in the packet head information. Correspondingly, the step 303 may be replaced with: reading the sixth flag bit in the packet head information, and determining, according to the sixth flag bit, whether the data packet of the preset format transmitted by the transmitting end is received.

For example, when the transmitting end generates the data packet of the preset format, the value of the sixth flag bit is set to be 1, and when the receiving end reads that the value of the sixth flag bit is 1, the receiving end decapsulates the data packet of the preset format.

Where, when the encapsulating entity is a MAC entity, the packet head information may be a MAC header.

In an embodiment, the packet head information and the header information may be information that is separate with each other, for example, a MAC header and a MAC sub-header; or, the packet head information and the header information may be combined, for example, the MAC sub-header is incorporated into the MAC header, which is not limited in this embodiment.

In this embodiment, the data packet generated by the transmitting end has eight preset formats, and data packets of the eight preset formats are respectively introduced below.

1) When attribute information of some data units is the same, the transmitting end generates a data packet of a first preset format. All data units with the same attribute information correspond to one piece of header information.

The data packet includes m data unit sets, each data unit set includes one piece of header information and k data units corresponding to the header information, where attribute information of the k data units is the same, and a sum of all data unit quantities k is n; m≥1, k≥1; where the header information includes transmission channel information of a data unit in the each data unit set, data length information, and the data unit quantity k in the each data unit set, where the data length information is a data length of one of the data units or a total data length of the k data units.

When k=1, the header information corresponding to the data unit includes the attribute information of the data unit and the data unit quantity 1; when k≥2, the header information corresponding to the data units includes transmission channel information of any one of the k data units, the data length information, and the data unit quantity k.

There are various manners for the transmitting end to generate the data packet of the first preset format, and this embodiment is illustrated in one of the manners: the transmitting end classifies data units corresponding to same attribute information into a data unit classification, and the data unit quantity in at least one data unit classification is greater than 1; for each data unit classification, the transmitting end generates one piece of header information for all data units in that data unit classification, and the header information and the data unit classification are taken as one data unit set.

For example, there are 4 data units to be transmitted, and attribute information of data units 1-3 is the same and is denoted as attribute information 1, and attribute information of a data unit 4 is different from the attribute information 1 and is denoted as attribute information 2. Then the transmitting end generates two data unit sets, where a first data unit set includes header information and the data units 1-3, where the header information includes the attribute information 1 and the data unit quantity 3; and a second data unit set includes header information and the data unit 4, where the header information includes the attribute information 2 and the data unit quantity 1.

After the above data packet is generated by the transmitting end, correspondingly, the step 304 may be replaced with: the receiving end reads head information in the data unit set for each data unit set; and the receiving end decapsulates the data units in the each data unit set according to transmission channel information, data length information and the data unit quantity k in the header information, where the data length information is a data length of one of the data units or a total data length of the k data units.

Specifically, when k=1, the data length information is a data length of one data unit, the receiving end reads one data unit from the data unit set according to the data length, and transmits the data unit to an upper layer entity indicated by the transmission channel information for processing. When k=2 and the data length information is a data length of one data unit, the receiving end reads each data unit from the data unit set according to the data length, and transmits the k read data units to an upper layer entity indicated by the transmission channel information for processing; when k=2 and the data length information is a total data length of the k data units, the receiving end reads the k data units from the data unit set according to the total data length, and transmits the k data units to an upper layer entity indicated by the transmission channel information for processing, or, the receiving end divides the total data length by the data unit quantity k to obtain a data length of each data unit, reads each data unit from the data unit set according to the data length, and transmits the k read data units to an upper layer entity indicated by the transmission channel information for processing.

It should be noted that, in the first implementation, the m data unit sets are cascaded, and the header information in each data unit set is located before the k data units corresponding to the header information.

Figure 4:
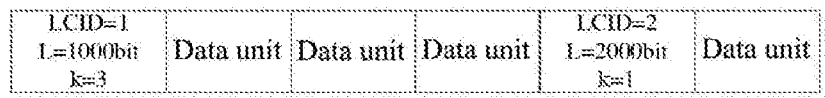
FIG. 4 is a schematic structural diagram of a first type of data packet according to an embodiment of the present disclosure.

Referring to FIG. 4, FIG. 4 illustrates a schematic structural diagram of a first type of data packet. The data packet in FIG. 4 includes two data unit sets, where a first data unit set includes header information and three data units, where transmission channel information LCID included in the header information is 1, data length information is a data length of one data unit, 1000 bits, and k is 3; and a second data unit set includes header information and one data unit, where transmission channel information LCID included in the header information is 2, data length information is 1000 bits, and k is 1. The locations of the first piece of header information and the second piece of header information may be interchanged, which is not limited in this embodiment.

Figure 5:
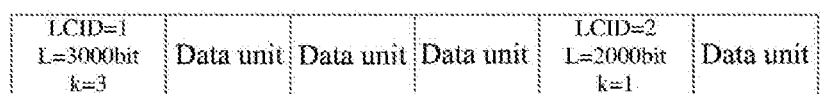
FIG. 5 is a schematic structural diagram of a second type of data packet according to an embodiment of the present disclosure.

Referring to FIG. 5, FIG. 5 illustrates a schematic structural diagram of a second type of data packet. The data packet in FIG. 5 includes two data unit sets, where a first data unit set includes header information and three data units, where transmission channel information LCID included in the header information is 1, data length information is a total data length of the three data units, 3000 bits, and k is 3; and a second data unit set includes header information and one data unit, where transmission channel information LCID included in the header information is 2, data length information is 2000 bits, and k is 1. The locations of the first piece of header information and the second piece of header information may be interchanged, which is not limited in this embodiment.

In this implementation, the receiving end reads the header information of the data unit set from an initial location of each data unit set.

It should be noted that, in the second implementation, m pieces of the header information are cascaded, n data units are cascaded, and the cascaded header information is located before or after the cascaded data units.

Referring to FIG. 6, FIG. 6 illustrates a schematic structural diagram of a third type of data packet. The data packet in FIG. 6 includes two data unit sets. In order from left to right, a first data unit set includes a first piece of header information and first three data units, where transmission channel information LCID included in the first piece of header information is 1, data length information is a data length of one data unit, 1000 bits, and k is 3; and a second data unit set includes a second piece of header information and a fourth data unit, where transmission channel information LCID included in the second piece of header information is 2, data length information is 2000 bits, and k is 1; the cascaded header information is located before the cascaded data units. The locations of the first piece of header information and the second piece of header information may be interchanged, which is not limited in this embodiment.

Referring to FIG. 7, FIG. 7 illustrates a schematic structural diagram of a fourth type of data packet. The difference between FIG. 7 and FIG. 6 lies in that, the cascaded header information is located after the cascaded data units. The locations of the first piece of header information and the second piece of header information may be interchanged, which is not limited in this embodiment.

The data length information is only illustrated as a data length of one data unit in FIG. 6 and FIG. 7, and when the data length information is a total data length of the k data units, the above implementation may also be employed, which will not be repeated in this embodiment.

In this implementation, the receiving end reads each piece of header information from a preset location of the cascaded header information. Where, when the cascaded header information is located before the cascaded data unit sets, the preset location is an initial location of the first piece of header information; and when the cascaded header information is located after the cascaded data unit sets, the preset location is an initial location or an end location of the last piece of header information.

It should be noted that, when the cascaded header information is located before the cascaded data unit sets, the data packet further includes packet head information, and the location of each piece of header information is indicated by the packet head information. Four indication manners will be introduced below.

a: The packet head information includes the initial location of the first piece of header information, and a length of each header information is preset, or, the packet head information includes the initial location of the first piece of header information and a length of each header information, where each piece of header information further includes a second flag bit, where the second flag bit is used to indicate that what is encapsulated in a data block immediately after the header information is header information, or, the second flag bit is used to indicate that what is encapsulated in a data block immediately after the header information is a data unit.

In this embodiment, a segment occupied by one piece of header information or one data unit is referred to as a data block. Referring to FIG. 6, each block in the figure is a data block.

The second flag bit may indicate, with a different value, that what is encapsulated in a data block immediately after the head information is header information, or, the second flag bit may indicate, with a different value, that what is encapsulated in a data block immediately after the head information is a data unit. For example, when a value of the second flag bit is 1, it is indicated that what is encapsulated in a data block immediately after the head information is header information; and when the value of the second flag bit is 0, it is indicated that what is encapsulated in a data block immediately after the head information is a data unit. The structure illustrated in FIG. 6 is taken as an example, a value of the second flag bit in the first piece of header information is 1, and a value of the second flag bit in the second piece of header information is 0.

Correspondingly, the receiving end reads the initial location of the first piece of header information in the packet head information, and sequentially reads each piece of header information from the initial location according to a preset length of each piece of header information or a length of each piece of header information in the packet head information, until the receiving end determines that what is encapsulated in a data block immediately after the head information is a data unit according to the second flag bit in the header information.

The structure shown in FIG. 6 is still taken as an example for illustration. The receiving end reads, according to the length of the header information, the first piece of header information from the initial location. Since the value of the second flag bit in the first piece of header information is 1, the receiving end reads, according to the length of the header information, the second piece of header information from the next bit of the end location of the first piece of header information. And since the value of the second flag bit in the second piece of header information is 0, after finishing reading the second piece of header information, the receiving end determines that all the cascaded header information has been read.

b: The packet head information includes the initial location of the first piece of header information and the quantity of piece of head information, and a length of each header information is preset, or, the packet head information includes the initial location of the first piece of header information, the quantity of piece of head information, and a length of each header information.

Correspondingly, the receiving end reads the initial location of the first piece of header information in the packet head information, and sequentially reads each piece of header information from the initial location according to the preset length of each piece of header information or the length of each piece of header information in the packet head information, until the quantity of piece of the read header information reaches the quantity of piece of head information.

The structure shown in FIG. 6 is still taken as an example for illustration. The quantity of piece of header information is 2. The receiving end reads, according to the length of the header information, the first piece of header information from the initial location, and records that the quantity of piece of the read header information is 1; then the receiving end reads, according to the length of the header information, the second piece of header information from the next bit of the end location of the first piece of header information, and records that the quantity of piece of the read header information is 2; and since the quantity of piece of the read header information is 2, the receiving end determines that all the cascaded header information has been read.

c: The packet head information includes the initial location of the first piece of header information and the end location of the last piece of header information, and a length of each header information is preset, or, the packet head information includes the initial location of the first piece of header information, the end location of the last piece of header information and a length of each header information.

Correspondingly, the receiving end reads the initial location of the first piece of header information in the packet head information, and sequentially reads each piece of header information from the initial location according to the preset length of each piece of header information or the length of each piece of header information in the packet head information, until the read location is the end location of the last piece of header information.

The structure shown in FIG. 6 is still taken as an example for illustration. Assuming that the initial location is the 11th bit, the end location is the 30th bit, and the length of each piece of header information is 10 bits, then the receiving end takes a content encapsulated in 11th-20th bits as the first piece of header information. Since the end location of the first piece of header information is the 20th bit instead of the 30th bit, the receiving end then takes a content encapsulated in 21th-30th bits as the second piece of header information. And since the end location of the second piece of header information is the 30th bit, the receiving end determines that all the cascaded header information has been read.

d: The packet head information includes the initial location of each data block and a third flag bit, where the third flag bit is used to indicate that what is encapsulated in the data block is header information, or, the third flag bit is used to indicate that what is encapsulated in the data block is a data unit.

The third flag bit may indicate, with a different value, that what is encapsulated in a corresponding data block is header information, or, the third flag bit may indicate, with a different value, that what is encapsulated in a corresponding data block is a data unit. For example, when a value of the third flag bit is 1, it is indicated that what is encapsulated in a corresponding data block is head information; and when a value of the third flag bit is 0, it is indicated that what is encapsulated in a corresponding data block is a data unit. The structure shown in FIG. 6 is taken as an example for illustration, then values of the third flag bits corresponding to the 1st-2nd blocks are 1, and values of the third flag bits corresponding to the 3rd-6th blocks are 0.

Correspondingly, the receiving end reads the initial location of each data block and the third flag bit in the packet head information, and reads the header information when the third flag bit indicates that what is encapsulated in the corresponding data block is header information.

The structure shown in FIG. 6 is still taken as an example for illustration. The receiving end determines that the values of the third flag bits corresponding to the 1st-2nd blocks are 1, reads the first piece of header information from the initial location of the first data block, reads the second piece of header information from the initial location of the second data block, and determines that all the cascaded header information has been read.

It should be noted that, when the cascaded header information is located after the cascaded data unit sets, the data packet further includes packet head information, and the location of each piece of header information is indicated by the packet head information. Four indication manners will be introduced below.

e: The packet head information includes a preset location, and a length of each header information is preset, or, the packet head information includes a preset location and a length of each header information, the preset location is the initial location or the end location of the last piece of header information. The header information further includes a fourth flag bit, where the fourth flag bit is used to indicate that what is encapsulated in a data block immediately before the header information is header information, or, the fourth flag bit is used to indicate that what is encapsulated in a data block immediately before the header information is a data unit.

The fourth flag bit may indicate, with a different value, that what is encapsulated in a data block immediately before the head information is header information, or, the fourth flag bit may indicate, with a different value, that what is encapsulated in a data block immediately after the head information is a data unit. For example, when a value of the fourth flag bit is 1, it is indicated that what is encapsulated in a data block immediately before the head information is header information; and when a value of the fourth flag bit is 0, it is indicated that what is encapsulated in a data block immediately before the head information is a data unit. The structure shown in FIG. 7 is taken as an example for illustration, then a value of the fourth flag bit in the last piece of header information is 1, and a value of the second flag bit in a penultimate piece of header information is 0.

Correspondingly, the receiving end reads the preset location in the packet head information, and sequentially reads each piece of header information from the preset location according to the preset length of each piece of header information or the length of each piece of header information in the packet head information, until the receiving end determines that what is encapsulated in a data block immediately before the head information is a data unit according to the fourth flag bit in the header information. The preset location is the initial location or the end location of the last piece of header information.

When the preset location is the initial location of the last piece of header information, the receiving end directly reads the last piece of header information from that location; and then locates the location which is ahead of the initial location by a length of one piece of the header information to obtain the initial location of the penultimate piece of header information, and in this manner, the receiving end reads each header information. When the preset location is the end location of the last piece of header information, the receiving end locates the location which is ahead of the end location by a length of one piece of the header information to obtain the initial location of the last piece of header information, and then sequentially reads each header information in the above manner.

The structure shown in FIG. 7 is still taken as an example for illustration. Assuming that the preset location is the initial location of the last piece of header information, then the receiving end reads, according to the length of the header information, the last piece of header information from the preset location. Since the value of the fourth flag bit in the last piece of header information is 1, the receiving end locates the location which is ahead of the preset location by a length of one piece of the header information to obtain the initial location of the penultimate piece of header information, and reads, according to the length of the header information, the penultimate piece of header information from the initial location of the penultimate piece of header information. And since the value of the fourth flag bit in the penultimate piece of header information is 0, after finishing reading the penultimate piece of header information, the receiving end determines that all the cascaded header information has been read.

f: The packet head information includes a preset location and the quantity of piece of header information, and a length of each header information is preset, or, the packet head information includes a preset location, the quantity of piece of header information and a length of each header information, the preset location is the initial location or the end location of the last piece of header information.

Correspondingly, the receiving end reads the preset location in the packet head information, and sequentially reads each piece of header information from the preset location according to the preset length of each piece of header information or the length of each piece of header information in the packet head information, until the quantity of piece of the read header information reaches the quantity of piece of head information. The preset location is the initial location or the end location of the last piece of header information.

The structure shown in FIG. 7 is still taken as an example for illustration. The quantity of piece of header information is 2. Assuming that the preset location is the initial location of the last piece of header information, then the receiving end reads, according to the length of the header information, the last piece of header information from the preset location, and records that the quantity of piece of the read header information is 1; and then the receiving end locates the location which is ahead of the preset location by a length of one piece of the header information to obtain the initial location of the penultimate piece of header information, reads, according to the length of the header information, the penultimate piece of header information from the initial location of the penultimate piece of header information, and records that the quantity of piece of the read header information is 2; and since the quantity of piece of the read header information is 2, the receiving end determines that all the cascaded header information has been read.

g: The packet head information includes the initial location of the first piece of header information and the end location of the last piece of header information, and a length of each header information is preset, or, the packet head information includes the initial location of the first piece of header information, the end location of the last piece of header information and a length of each header information.

Correspondingly, the receiving end reads the initial location of the first piece of header information in the packet head information, and sequentially reads each piece of header information from the initial location according to the preset length of each piece of header information or the length of each piece of header information in the packet head information, until the read location is the end location of the last piece of header information.

The structure shown in FIG. 7 is still taken as an example for illustration. Assuming that the initial location is the 111th bit, the end location is the 130th bit, and the length of each piece of header information is 10 bits, then the receiving end takes a content encapsulated in the 111th-120th bits as the first piece of header information. Since the end location of the first piece of header information is the 120th bit instead of the 130th bit, the receiving end then takes a content encapsulated in the 121th-130th bits as the second piece of header information. And since the end location of the second piece of header information is the 130th bit, the receiving end determines that all the cascaded header information has been read.

h: The packet head information includes the initial location of each data block and a fifth flag bit, where the fifth flag bit is used to indicate that what is encapsulated in a data block is header information, or, the fifth flag bit is used to indicate that what is encapsulated in a data block is a data unit.

The fifth flag bit may indicate, with a different value, that what is encapsulated in a corresponding data block is header information, or, the fifth flag bit may indicate, with a different value, that what is encapsulated in a corresponding data block is a data unit. For example, when a value of the fifth flag bit is 1, it is indicated that what is encapsulated in a corresponding data block is head information; and when a value of the fifth flag bit is 0, it is indicated that what is encapsulated in a corresponding data block is a data unit. The structure shown in FIG. 7 is taken as an example for illustration, then values of the fifth flag bits corresponding to the 1st-4th blocks are 0, and values of the fifth flag bits corresponding to the 5th-6th blocks are 1.

Correspondingly, the receiving head reads the initial location of each data block and the fifth flag bit in the packet head information, and when the fifth flag bit indicates that what is encapsulated in the data block is header information, the receiving end reads the header information.

The structure shown in FIG. 7 is still taken as an example for illustration. The receiving end determines that the values of the fifth flag bits corresponding to the 5th-6th blocks are 1, reads the first piece of header information from the initial location of the fifth data block, reads the second piece of header information from the initial location of the sixth data block, and determines that all the cascaded header information has been read.

2) When attribute information of some data units is the same and attribute information of some data units is partially the same, the transmitting end generates a data packet of a second preset format. Each header information correspond to s data units, a first identifier in the header information is used to indicate that the header information includes transmission channel information and data length information, and a second identifier in the header information is used to indicate that the header information includes difference information, or, the second identifier in the header information is used to indicate that the header information does not include same information. Where, the difference information is determined according to different information in attribute information of the data units in different data unit subsets in a same data unit set, and the same information is information other than the difference information in the attribute information. It should be noted that, a total data amount of the first identifier and the second identifier is less than the a data amount of the same information indicated by the second identifier.

The data packet includes i data unit sets, each data unit set includes j data unit subsets, and each data unit subset includes one piece of header information and s data units corresponding to the header information, where attribute information of data units in a same data unit subset is the same, attribute information of data units in different data unit subsets is partially the same, and a sum of all data unit quantities s is n; i≥1, j≥2, s≥1; where one of j pieces of header information included in each data unit set includes a first identifier, transmission channel information, data length information, and the data unit quantity s, and each of the rest pieces of the head information included in the each data unit set includes a second identifier, difference information and the data unit quantity s.

The difference information is transmission channel information or a data length or a total data length determined according to the data length. Where, when j≥3, the difference information may be obtained by comparison with the header information including the first identifier. For example, a first piece of header information includes the first identifier, an LCID in the first piece of header information is 1, and the data length is 2000 bits; a second piece of header information includes the second identifier, an LCID in the second piece of header information is 2, and the data length is 2000 bits; a third piece of header information includes the second identifier, an LCID in the third piece of header information is 1, and the data length is 1000 bits. Then, compared with the first piece of header information, the difference information in the second piece of header information is the LCID; and compared with the first piece of header information, the difference information in the third piece of header information is the data length. Or, the difference information may be obtained by comparison with a previous piece of header information. The above three pieces of head information are still taken as an example for illustration. Then, compared with the first piece of header information, the difference information in the second piece of header information is the LCID; and compared with the second piece of header information, the difference information in the third piece of header information is the LCID and the data length.

When j=2, the first identifier and the second identifier may be set, for example, the first identifier is used to indicate that the header information includes the transmission channel information and the data length information, and the second identifier is used to indicate that the difference information included in the header information is the transmission channel information or that the same information included in the header information is the data length information, or, the second identifier is used to indicate that the difference information included in the header information is the data length information or that the same information is the transmission channel information. The first identifier and the second identifier may be implemented by different values of a flag bit. For example, when a value of the flag bit is 1, it is indicated that the header information includes the first identifier; and when the value of the flag bit is 0, it is indicated that the header information includes the second identifier.

When j≥3, it is also possible to set an identifier for each type of information of the attribute information. For example, the first identifier is used to indicate that the header information includes the transmission channel information and the data length information, the second identifier is used to indicate that the difference information included in the header information is the transmission channel information or that the same information included in the header information is the data length information, and a fourth identifier is used to indicate that the difference information included in the header information is the data length information or that the same information is the transmission channel information, which is limited in this embodiment. The first identifier, the second identifier and the fourth identifier may be implemented by different values of a flag bit. For example, when a value of the flag bit is 1, it is indicated that the header information includes the first identifier; when the value of the flag bit is 0, it is indicated that the header information includes the second identifier; and when the value of the flag bit is 2, it is indicated that the header information includes the fourth identifier.

It should be noted that, a total data amount of the first identifier and the fourth identifier is less than a data amount of the same information indicated by the fourth identifier.

For the header information including the first identifier, when s=1, the header information further includes the attribute information of the data unit and the data unit quantity 1; and when s≥2, the header information further includes the transmission channel information of any one of the s data units, the data length information and the data unit quantity s. For the header information including the second identifier, when s=1, the header information further includes the difference information and the data unit quantity 1; and when s≥2, the header information further includes the difference information and the data unit quantity s.

This embodiment does not limit the locational relationship between the header information including the first identifier and the pieces of the header information including the second identifier in a data unit set.

There are various manners for the transmitting end to generate the data packet of the second preset format, and this embodiment is illustrated in one of the manners: the transmitting end extracts a data unit classification from a data unit/data units that has/have not been extracted in the n data units, where the attribute information of all the data units in the data unit classification is the same; the transmitting end generates one piece of header information including the first identifier, the transmission channel information and the data unit quantity s for all the data units in the data unit classification; the transmitting end searches for specific attribute information from attribute information of a data unit/data units that has/have not been extracted, where the specific attribute information is partially the same as the attribute information of any one of the data units in the above data unit classification; when the specific attribute information is found, the transmitting end extracts a respective data unit/respective data units corresponding to the specific attribute information as another data unit classification, generates one piece of header information including the second identifier, the difference information and the data unit quantity s for all the data units in the another data unit classification, and continues the step of searching for specific attribute information from attribute information of a data unit/data units that has/have not been extracted; and when no specific attribute information is found, the transmitting end continues the step of extracting a data unit classification from a data unit/data units that has/have not been extracted in then data units.

For example, there are 4 data units to be transmitted, attribute information of a data unit 1 and a data unit 2 is the same and is denoted as attribute information 1, attribute information of a data unit 3 is partially the same as the attribute information 1 and is denoted as attribute information 2, and attribute information of a data unit 4 is completely different from the attribute information 1 and 2 and is denoted as attribute information 3. Then the transmitting end generates two data unit sets. A first data unit set includes two data unit subsets, where a first data unit subset includes header information and the data unit 1 and the data unit 2, and the header information includes the first identifier, the attribute information 1, and the data unit quantity 2; and a second data unit subset includes header information and the data unit 3, and the header information includes the second identifier, difference information determined according to the attribute information 1 and the attribute information 2, and the data unit quantity 1. A second data unit set includes one data unit subset, where that data unit subset includes header information and the data unit 4, and the header information includes the first identifier, the attribute information 3, and the data unit quantity 1.

After the transmitting end generates the data packet, the step 304 may be replaced with: reading, for each data unit set, header information in each data unit subset in the data unit set; decapsulating, for each piece of header information, the data units corresponding to the header information according to the transmission channel information, data length information and the data unit quantity s which are read from the header information, when the header information includes the first identifier; and decapsulating, for each piece of header information, the data units corresponding to the header information according to the difference information and the data unit quantity s which are read from the header information as well as the header information including the first identifier, when the header information includes the second identifier.

The process of the receiving end decapsulating the data packet subset is divided into two parts. The first part is the receiving end decapsulating the data unit subset in which the header information includes the first identifier. This part is the same as the content of the receiving end decapsulating a data unit set in 1), and will not be described here. The second part is the receiving end decapsulating the data unit subset in which the header information includes the second identifier. For convenience of description, the header information including the first identifier is referred to herein as first header information, and the header information including the second identifier is referred to as second header information. Then the receiving end determines that the second header information includes the difference information according to the second identifier; when the difference information is transmission channel information, the receiving end reads s data units according to the data length information in the first header information and the data unit quantity s in the second header information, and transmits the s data units to an upper layer entity indicated by the transmission channel information in the second header information; when the difference information is the data length, the receiving end reads s data units according to the data unit quantity s and the data length in the second header information, and transmits the s data units to an upper layer entity indicated by the transmission channel information in the first header information; and when the difference infatuation is the total data length, the receiving end reads s data units according to the data unit quantity s and the total data length in the second header information, and transmits the s data units to an upper layer entity indicated by the transmission channel information in the first header information.

In an embodiment, the receiving end may transmit the read data units to the upper layer entity for processing after all the data units in one data unit subset have been read; and the receiving end may also transmit the read data units to the upper layer entity for processing after all the units in all the data subsets in one data unit set have been read, which is not limited in this embodiment.

It should be noted that, in a first implementation, the i data unit sets are cascaded, the j data unit subsets are cascaded, and the header information in each data unit subset is located before the s data units corresponding to the header information.

Referring to FIG. 8, FIG. 8 illustrates a schematic structural diagram of a fifth type of data packet. The data packet in FIG. 8 includes one data unit set including two data unit subsets, where a first data unit subset includes header information and three data units, where a value of a first identifier included in the header information is 1, transmission channel information LCID is 1, data length information is a data length of one data unit, 1000 bits, and s is 3; and a second data unit subset includes header information and one data unit, where a value of a second identifier included in the header information is 0, data length information is 2000 bits, and s is 1. It can be seen from the above example that, transmission channel information LCID of the data unit in the second data unit subset is 1.

Referring to FIG. 9, FIG. 9 illustrates a schematic structural diagram of a sixth type of data packet. The data packet in FIG. 9 includes one data unit set including two data unit subsets, where a first data unit subset includes header information and three data units, where a value of a first identifier included in the header information is 1, transmission channel information LCID is 1, data length information is a total data length of three data units, 3000 bits, and s is 3; and a second data unit subset includes header information and one data unit, where a value of a second identifier included in the header information is 2, data length information is a data length of one data unit, 2000 bits, and s is 1. It can be seen from the above example that, transmission channel information LCID of the data unit in the second data unit subset is 1.

Referring to FIG. 10, FIG. 10 illustrates a schematic structural diagram of a seventh type of data packet. The data packet in FIG. 10 includes one data unit set including three data unit subsets, where a first data unit subset includes header information and three data units, where a value of a first identifier included in the header information is 1, transmission channel information LCID is 1, data length information is a data length of one data unit, 1000 bits, and s is 3; a second data unit subset includes header information and one data unit, where a value of a second identifier included in the header information is 2, data length information is a data length of one data unit, 2000 bits, and s is 1; and a third data unit subset includes header information and one data unit, where a value of a fourth identifier included in the header information is 2, transmission channel information LCID is 2, and s is 1. It can be seen from the above example, transmission channel information LCID of the data unit in the second data unit subset is 1; when the difference information is obtained by comparison with the header information including the first identifier, the data length of the data unit in the third data unit subset is 1000 bits; and when the difference information is obtained by comparison with the previous piece of header information, the data length of the data unit in the third data unit subset is 2000 bits.

In this implementation, the receiving end reads the header information of the data unit subset from an initial location of each data unit subset.

It should be noted that, in a second implementation, q pieces of the header information are cascaded, the n data units are cascaded, the cascaded header information is located before or after the cascaded data units, where q is a sum of data unit subset quantities j for the i data unit sets.

Referring to FIG. 11, FIG. 11 illustrates a schematic structural diagram of an eighth type of data packet. The data packet in FIG. 11 includes one data unit set including two data unit subsets, where a first data unit subset includes header information and first three data units, where the value of the first identifier included in the header information is 1, transmission channel information LCID is 1, data length information is a data length of one data unit, 1000 bits, and s is 3; and a second data unit subset includes header information and a fourth data unit, where a value of a second identifier included in the header information is 0, data length information is 2000 bits, and s is 1, The cascaded header information is located before the cascaded data units. The locations of the first piece of header information and the second piece of header information may be interchanged, which is not limited in this embodiment. It can be seen from the above example that, transmission channel information LCID of the data unit in the second data unit subset is 1.

Referring to FIG. 12, FIG. 12 illustrates a schematic structural diagram of a ninth type of data packet. The difference between FIG. 12 and FIG. 11 lies in that, the cascaded header information is located after the cascaded data units. The locations of the last piece of header information and the penultimate piece of header information may be interchanged, which is not limited in this embodiment. It can be seen from the above example that, transmission channel information LCID of the data unit in the second data unit subset is 1.

In this implementation, the receiving end reads each piece of header information from a preset location of the cascaded header information. Where, the description of the preset location is detailed in the description for 1), which will not be repeated herein.

3) When attribute information of some data units is the same and attribute information of some data units is partially the same, the transmitting end generates a data packet of a third preset format. Each piece of header information corresponds to s data units, a first flag bit in the packet head information is used to indicate that each piece of header information includes transmission channel information and data length information, or, the first flag bit in the packet head information is used to indicate that each piece of header information includes difference information. Where, the description of the difference information is detailed in the description for 2). It should be noted that, a data amount of the first flag bit is less than a data amount of the same information indicated by the first flag bit.

The data packet includes packet head information and i data unit sets, each data unit set includes j data unit subsets, each data unit subset includes one piece of header information and s data units corresponding to the header information, where attribute information of data units in a same data unit subset is the same, attribute information of data units in different data unit subsets is partially the same, and a sum of all data unit quantities s is n; i≥1, j≥2, s≥1; where one of j pieces of header information included in each data unit set includes transmission channel information, data length information, and the data unit quantity s, and each of the rest pieces of the head information included in the each data unit set includes difference information and the data unit quantity s.

The first flag bit may indicate, with a different value, that each piece of header information includes the transmission channel information and the data length information, or, the first flag bit may indicate, with a different value, that each piece of header information includes the difference information. For example, when a value of the first flag bit is 1, it is indicated that the header information includes the transmission channel information and the data length information; and when the value of the first flag bit is 0, it is indicated that the header information includes the difference information.

There are various manners for the transmitting end to generate the data packet of the third preset format, and this embodiment is illustrated in one of the manners: the transmitting end extracts a data unit classification from a data unit/data units that has/have not been extracted in the n data units, where the attribute information of all the data units in the data unit classification is the same; the transmitting end generates one piece of header information including the transmission channel information and the data unit quantity s for all the data units in the data unit classification, and sets the first flag bit corresponding to the header information in the packet head information to indicate that the header information includes the transmission channel information and the data length information; the transmitting end searches for specific attribute information from attribute information of a data unit/data units that has/have not been extracted, where the specific attribute information is partially the same as the attribute information of any one of the data units in the above data unit classification; when the specific attribute information is found, the transmitting end extracts a respective data unit/respective data units corresponding to the specific attribute information as another data unit classification, generates one piece of header information including the difference information for all the data units in the another data unit classification, sets the first flag bit corresponding to the header information in the packet head information to indicate that the header information includes the difference information, and continues the step of searching for specific attribute information from attribute information of a data unit/data units that has/have not been extracted; and when no specific attribute information is found, the transmitting end continues the step of extracting a data unit classification from a data unit/data units that has/have not been extracted in the n data units.

For example, there are 4 data units to be transmitted, attribute information of a data unit 1 and a data unit 2 is the same and is denoted as attribute information 1, attribute information of a data unit 3 is partially the same as the attribute information 1 and is denoted as attribute information 2, and attribute information of a data unit 4 is completely different from the attribute information 1 and 2 and is denoted as attribute information 3. Then the transmitting end generates two data unit sets. A first data unit set includes two data unit subsets, where a first data unit subset includes header information and the data unit 1 and the data unit 2, where the header information includes the attribute information 1 and the data unit quantity 2, and the value of the first flag bit corresponding to the header information in the packet head information is 1, and a second data unit subset includes header information and the data unit 3, where the header information includes the second identifier, difference information determined according to the attribute information 1 and the attribute information 2, and the data unit quantity 1, and the value of the first flag bit corresponding to the header information in the packet head information is 0. A second data unit set includes one data unit subset, where that data unit subset includes header information and the data unit 4, where the header information includes the first identifier, the attribute information 3, and the data unit quantity 1, and the value of the first flag bit corresponding to the header information in the packet head information is 1.

After the transmitting end generates the data packet, the step 304 may be replaced with: reading a first flag bit corresponding to each piece of header information in the packet head information; reading, for each data unit set, header information in each data unit subset in the data unit set; decapsulating, for each piece of header information, the data units corresponding to the header information according to the transmission channel information, data length information and the data unit quantity which are read from the header information, when the first flag bit corresponding to the header information indicates that the header information includes the transmission channel information and the data length information; and decapsulating, for each piece of header information, the data units corresponding to the header information according to the difference information and the data unit quantity s which are read from the header information as well as the header information corresponding to the first flag bit that is used to indicate that the header information includes the transmission channel information and the data length information, when the first flag bit corresponding to the header information indicates that the header information includes the difference information.

The process of the receiving end decapsulting the data packet of the third preset format is similar as the process of the receiving end decapsulting the data packet of the second preset format, and the difference lies in that, when decapsulating the data packet of the third preset format, the receiving end determines which information is included in the header information according to the first flag bit corresponding to the header information in the packet head information; when decapsulating the data packet of the second preset format, the receiving end determines which information is included in the header information according to the first identifier or the second identifier in the header information. The process of decapsulating the data packet of the third preset format will not be repeated herein.

It should be noted that, in a first implementation, the i data unit sets are cascaded, the j data unit subsets are cascaded, the header information in each data unit subset is located before the s data units corresponding to the header information, and the packet head information is located before or after the cascaded data unit sets.

Referring to FIG. 13, FIG. 13 illustrates a schematic structural diagram of a tenth type of data packet. The data packet in FIG. 13 includes packet head information and one data unit set including two data unit subsets, where a first data unit subset includes header information and three data units, where transmission channel information LCID included in the header information is 1, data length information is a data length of one data unit, 1000 bits, s is 3, and a value of a first flag bit corresponding to the header information in the packet head information is 1; and a second data unit subset includes header information and one data unit, where data length information included in the header information is 2000 bits, s is 1, and a value of a first flag bit corresponding to the header information in the packet head information is 0. It can be seen from the above example that, transmission channel information LCID of the data unit in the second data unit subset is 1.

In this implementation, the receiving end reads the header information of the data unit subset from an initial location of each data unit subset.

It should be noted that, in a second implementation, q pieces of header information are cascaded, the n data units are cascaded, the cascaded header information is located before or after the cascaded data units, and the packet head information is located before the cascaded header information or after the cascaded data units, where q is a sum of data unit subset quantities j for the i data unit sets.

In this implementation, the receiving end reads each piece of header information from a preset location of the cascaded header information.

4) When attribute information of some data units is the same and attribute information of some data units is partially the same, the transmitting end generates a data packet of a fourth preset format. Each piece of header information corresponds to one data unit, a first identifier in the head information is used to indicate that the header information includes transmission channel information and data length information, and a second identifier in the head information is used to indicate that the header information includes difference information, or, the second identifier in the head information is used to indicate that the header information does not include same information. Where, the descriptions of the first identifier, the second identifier, the difference information, and the same information are detailed in the description for 2). It should be noted that, a total data amount of the first identifier and the second identifier is less than a data amount of the same information indicated by the second identifier.

The data packet includes i data unit sets, each data unit set includes j data unit subsets, each data unit subset includes one piece of header information and one data unit corresponding to the header information, where attribute information of data units in different data unit subsets is partially the same, and a total quantity of data units is n; i≥1, j≥2, s≥1; where one of j pieces of header information included in each data unit set includes a first identifier, transmission channel information and a data length, and each of the rest pieces of the head information included in the each data unit set includes a second identifier and difference information.

This embodiment does not limit the locational relationship between the header information including the first identifier and the pieces of the header information including the second identifier in a data unit set.

There are various manners for the transmitting end to generate the data packet of the fourth preset format, and this embodiment is illustrated in one of the manners: the transmitting end extracts a data unit from a data unit/data units that has/have not been extracted in the n data units; the transmitting end generates one piece of header information including the first identifier, the transmission channel information and the data length information for the data unit; the transmitting end searches for specific attribute information from attribute information of a data unit/data units that has/have not been extracted, where the specific attribute information is partially the same as the attribute information of the data unit; when the specific attribute information is found, the transmitting end generates one piece of header information including the second identifier and the difference information for one data unit corresponding to the specific attribute information, and continues the step of searching for specific attribute information from attribute information of a data unit/data units that has/have not been extracted; and when no specific attribute information is found, the transmitting end continues the step of extracting a data unit from a data unit/data units that has/have not been extracted in the n data units.

For example, there are 3 data units to be transmitted, attribute information of a data unit 1 is denoted as attribute information 1, attribute information of a data unit 2, which is denoted as attribute information 2, is the same as that of a data unit 3 and is partially the same as the attribute information 1. Then the transmitting end generates one data unit set including three data unit subsets, where a first data unit subset includes header information and one data unit, where the header information includes the first identifier and the attribute information 1; a second data unit subset includes header information and one data unit, where header information includes the second identifier and the difference information determined according to the attribute information 1 and the attribute information 2; and a third data unit subset includes header information and one data unit, where the header information includes the second identifier and the difference information determined according to the attribute information 1 and the attribute information 2.

After the transmitting end generates the data packet, the step 304 may be replaced with: reading, for each data unit set, header information in each data unit subset in the data unit set; decapsulating, for each piece of header information, the data unit corresponding to the header information according to the transmission channel information and the data length information which are read from the header information, when the header information includes a first identifier and the first identifier is used to indicate that the header information includes the transmission channel information and the data length; and decapsulating, for each piece of header information, the data unit corresponding to the header information according to difference information read from the header information as well as the header information including the first identifier, when the header information includes a second identifier and the second identifier is used to indicate that the header information includes the difference information.

The process of the receiving end decapsulating the data packet of the fourth preset format is similar as the process of the receiving end decapsulating the data packet of the second preset format, and the difference lies in that, when decapsulating the data packet of the fourth preset format, the data unit quantity in each data unit subset is 1, and when decapsulating the data packet of the second preset format, the data unit quantity in each data unit subset is s. The process of decapsulating the data packet of the fourth preset format will not be repeated herein.

It should be noted that, in a first implementation, the i data unit sets are cascaded, the j data unit subsets are cascaded, and the header information in each data unit subset is located before the one data unit corresponding to the header information.

Referring to FIG. 14, FIG. 14 illustrates a schematic structural diagram of an eleventh type of data packet. The data packet in FIG. 14 includes one data unit set including three data unit subsets, where a first data unit subset includes header information and one data unit, where a value of a first identifier included in the header information is 1, transmission channel information LCID is 1, and data length information is a data length of one data unit, 1000 bits; a second data unit subset includes header information and one data unit, where a value of a second identifier included in the header information is 0, and data length information is a data length of one data unit, 2000 bits; and a third data unit subset includes header information and one data unit, where a value of a second identifier included in the header information is 0, and data length information is a data length of one data unit, 2000 bits. It can be seen from the above example that, transmission channel information LCIDs of the data units in the second data unit subset and the third data unit subset each are 1.

Referring to FIG. 15, FIG. 15 illustrates a schematic structural diagram of a twelfth type of data packet. The data packet in FIG. 15 includes one data unit set including three data unit subsets, where a first data unit subset includes header information and one data unit, where a value of a first identifier included in the header information is 1, transmission channel information LCID is 1, and data length information is a data length of one data unit, 1000 bits; a second data unit subset includes header information and one data unit, where a value of a second identifier included in the header information is 0, and transmission channel information LCID is 2; and a third data unit subset includes header information and one data unit, where a value of a second identifier included in the header information is 0, and transmission channel information LCID is 2. It can be seen from the above example that, data lengths of the data units in the second data unit subset and the third data unit subset each are 1000 bits.

In this implementation, the receiving end reads the header information of the data unit subset from an initial location of each data unit subset.

It should be noted that, in a second implementation, n pieces of the header information are cascaded, the n data units are cascaded, and the cascaded header information is located before or after the cascaded data units.

Referring to FIG. 16, FIG. 16 illustrates a schematic structural diagram of a thirteenth type of data packet. The data packet in FIG. 16 includes one data unit set including three data unit subsets, where a first data unit subset includes header information and a first data unit, where a value of a first identifier included in the header information is 1, transmission channel information LCID is 1, and data length information is a data length of one data unit, 1000 bits; a second data unit subset includes header information and a second data unit, where a value of a second identifier included in the header information is 0, and data length information is 2000 bits; and a third data unit subset includes header information and a third data unit, where a value of a second identifier included in the header information is 0, and data length information is 2000 bits; and the cascaded header information is located before the cascaded data units. The locations of the three pieces of header information may be interchanged, which is not limited in this embodiment. It can be seen from the above example that, transmission channel information LCIDs of the data units in the second data unit subset and the third data unit subset each are 1.

Referring to FIG. 17, FIG. 17 illustrates a schematic structural diagram of a fourteenth type of data packet. The difference between FIG. 17 and FIG. 16 lies in that, the cascaded header information is located after the cascaded data units. The locations of the three pieces of header information may be interchanged, which is not limited in this embodiment. It can be seen from the above example that, transmission channel information LCIDs of the data units in the second data unit subset and the third data unit subset each are 1.

In this implementation, the receiving end reads each piece of header information from a preset location of the cascaded header information.

5) When attribute information of some data units is the same and attribute information of some data units is partially the same, the transmitting end generates a data packet of a fifth preset format. Each header information corresponds to one data unit, a first flag bit in packet head information is used to indicate that each piece of header information includes transmission channel information and data length information, or, the first flag bit in the packet head information is used to indicate that each piece of header information includes difference information. Where, the description of the difference information is detailed in the description for 2), and the description of the first flag bit is detailed in the description for 3). It should be noted that, a data amount of the first flag bit is less than a data amount of the same information indicated by the first flag bit.

The data packet includes packet head information and i data unit sets, each data unit set includes j data unit subsets, each data unit subset includes one piece of header information and one data unit corresponding to the header information, where attribute information of data units in different data unit subsets is partially the same, and a total quantity of data units is n; i≥1, j≥2; where one of j pieces of header information included in each data unit set includes transmission channel information and a data length, and each of the rest pieces of the head information included in the each data unit set includes difference information.

There are various manners for the transmitting end to generate the data packet of the fifth preset format, and this embodiment is illustrated in one of the manners: the transmitting end extracts a data unit from a data unit/data units that has/have not been extracted in the n data units; the transmitting end generates one piece of header information including transmission channel information and data length information for the data unit, and sets a first flag bit corresponding to the header information in the packet header information to indicate that the header information includes the transmission channel information and the data length information; the transmitting end searches for specific attribute information from attribute information of a data unit/data units that has/have not been extracted, where the specific attribute information is partially the same as the attribute information of the data unit; when the specific attribute information is found, the transmitting end generates one piece of header information including the difference information for one data unit corresponding to the specific attribute information, sets the first flag bit corresponding to the header information in the packet head information to indicate that the header information includes the difference information, and continues the step of searching for specific attribute information from attribute information of a data unit/data units that has/have not been extracted; and when no specific attribute information is found, the transmitting end continues the step of extracting a data unit from a data unit/data units that has/have not been extracted in the n data units.

For example, there are 3 data units to be transmitted, attribute information of a data unit 1 is denoted as attribute information 1, attribute information of a data unit 2, which is denoted as attribute information 2, is the same as that of a data unit 3 and is partially the same as the attribute information 1. Then the transmitting end generates one data unit set including three data unit subsets, where a first data unit subset includes header information and one data unit, where the header information includes the attribute information 1, and a value of a first flag bit corresponding to the header information in the packet head information is 1; a second data unit subset includes header information and one data unit, where the header information includes difference information determined according to the attribute information 1 and the attribute information 2, and a value of a first flag bit corresponding to the header information in the packet head information is 0; and a third data unit subset includes header information and one data unit, where the header information includes difference information determined according to the attribute information 1 and the attribute information 2, and a value of a first flag bit corresponding to the header information in the packet head information is 0.

After the transmitting end generates the data packet, the step 304 may be replaced with: reading a first flag bit corresponding to each piece of header information in the packet head information; reading, for each data unit set, header information in each data unit subset in the data unit set; decapsulating, for each piece of header information, the data unit corresponding to the header information according to the transmission channel information and the data length information which are read from the header information, when the first flag bit corresponding to the header information indicates that the header information includes the transmission channel information and the data length; and decapsulating, for each piece of header information, the data unit corresponding to the header information according to the difference information read from header information as well as the header information corresponding to the first flag bit that is used to indicate that the header information includes the transmission channel information and the data length, when the first flag bit corresponding to the header information indicates that the header information includes the difference information.

The process of the receiving end decapsulating the data packet of the fifth preset format is similar as the process of the receiving end decapsulating the data packet of the fourth preset format, and the difference lies in that, when decapsulating the data packet of the fifth preset format, the receiving end determines which information is included in the header information according to the first flag bit corresponding to the header information in the packet head information, and when decapsulating the data packet of the fourth preset format, the receiving end determines which information is included in the header information according to the first identifier or the second identifier in the header information. The process of decapsulating the data packet of the fifth preset format will not be repeated herein.

It should be noted that, in a first implementation, the i data unit sets are cascaded, the j data unit subsets are cascaded, the header information in each data unit subset is located before the one data unit corresponding to the header information, and the packet head information is located before or after the cascaded data unit sets.

Referring to FIG. 18, FIG. 18 illustrates a schematic structural diagram of a fifteenth type of data packet. The data packet in FIG. 18 includes packet head information and one data unit set including three data unit subsets, where a first data unit subset includes header information and a first data unit, where transmission channel information LCID included in the header information is 1, data length information is a data length of one data unit, 1000 bits, and a value of a first flag bit corresponding to the header information in the packet head information is 1; a second data unit subset includes header information and a second data unit, where data length information included in the header information is 2000 bits, and a value of a first flag bit corresponding to the header information in the packet head information is 0; and a third data unit subset includes header information and a third data unit, where data length information included in the header information is 2000 bits, and a value of a first flag bit corresponding to the header information in the packet head information is 0. It can be seen from the above example that, transmission channel information LCIDs of the data units in the second data unit subset and the third data unit subset each are 1.

In this implementation, the receiving end reads the header information of the data unit subset from an initial location of each data unit subset.

It should be noted that, in a second implementation, n pieces of the header information are cascaded, the n data units are cascaded, the cascaded header information is located before or after the cascaded data units, and the packet head information is located before the cascaded header information or after the cascaded data units.

In this implementation, the receiving end reads each piece of header information from a preset location of the cascaded header information.

6) When attribute information of some data units is the same, the transmitting end generates a data packet of a sixth preset format. Each data unit corresponds to one piece of header information.

The data packet includes i data unit sets, each data unit set includes j data unit subsets, each data unit subset includes one piece of header information and one data unit corresponding to the header information, where attribute information of data units in a same data unit set is the same, and a total quantity of data units is n; i≥1, j≥2; where one of j pieces of header information included in each data unit set includes a first identifier, transmission channel information and a data length, and each of the rest pieces of the head information included in the each data unit set includes a third identifier; the first identifier in the head information is used to indicate that the header information includes transmission channel information and a data length; the third identifier in the head information is used to indicate that the header information does not include transmission channel information and a data length.

The first identifier and the third identifier may be implemented by different values of a flag bit. For example, when a value of the flag bit is 1, it is indicated that the header information includes the first identifier; and when the value of the flag bit is 0, it is indicated that the header information includes the third identifier.

It should be noted that, a total data amount of the first identifier and the third identifier is less than a data amount of the same information indicated by the third identifier.

There are various manners for the transmitting end to generate the data packet of the sixth preset format, and this embodiment is illustrated in one of the manners: the transmitting end extracts a data unit from a data unit/data units that has/have not been extracted in the n data units; the transmitting end generates one piece of header information including the first identifier, the transmission channel information and the data length information for the data unit; the transmitting end searches for specific attribute information from attribute information of a data unit/data units that has/have not been extracted, where the specific attribute information is the same as the attribute information of the data unit; when the specific attribute information is found, the transmitting end generates one piece of header information including the third identifier for one data unit corresponding to the specific attribute information, and continues the step of searching for specific attribute information from attribute information of a data unit/data units that has/have not been extracted; and when no specific attribute information is found, the transmitting end continues the step of extracting a data unit from a data unit/data units that has/have not been extracted in the n data units.

For example, there are 3 data units to be transmitted, and attribute information of data units 1-3 is the same. Then the transmitting end generates one data unit set including three data unit subsets, where a first data unit subset includes header information and one data unit, and the header information includes a first identifier and attribute information; a second data unit subset includes header information and one data unit, and the header information includes the third identifier; and a third data unit subset includes header information and one data unit, and the header information includes the third identifier.

After the transmitting end generates the data packet, the step 304 may be replaced with: reading, for each data unit set, header information in each data unit subset in the data unit sets; decapsulating, for each piece of header information, the data unit corresponding to the header information according to the transmission channel information and the data length which are read from the header information, when the header information includes a first identifier and the first identifier is used to indicate that the header information includes the transmission channel information and the data length; and decapsulating, for each piece of header information, the data unit corresponding to the header information according to the header information including the first identifier, when the header information includes a third identifier and the third identifier is used to indicate that the header infatuation does not include the transmission channel information and the data length.

The process of the receiving end decapsulating the data packet of the sixth preset format is similar as the process of the receiving end decapsulating the data packet of the fourth preset format, and the difference lies in that, when decapsulating the data packet of the sixth preset format, the receiving end reads the attribute information form the header information including the first identifier according to the third identifier; and when decapsulating the data packet of the fourth preset format, the receiving end reads the same information from the header information including the first identifier according to the second identifier. The process of decapsulating the data packet of the sixth preset format will not be repeated herein.

It should be noted that, in a first implementation, the i data unit sets are cascaded, the j data unit subsets are cascaded, and the header information in each data unit subset is located before the one data unit corresponding to the header information.

Referring to FIG. 19, FIG. 19 illustrates a schematic structural diagram of a sixteenth type of data packet. The data packet in FIG. 19 includes one data unit set including three data unit subsets, where a first data unit subset includes header information and one data unit, where a value of a first identifier included in the header information is 1, transmission channel information LCID is 1, and data length information is a data length of one data unit, 1000 bits; a second data unit subset includes header information and one data unit, and a value of a third identifier included in the header information is 0; and a third data unit subset includes header information and one data unit, where a value of a third identifier included in the header information is 0. Transmission channel information LCIDs of the data units of the second data unit subset and the third data unit subset each are 1, and data length information each is 1000 bits.

In this implementation, the receiving end reads the header information of the data unit subset from an initial location of each data unit subset.

It should be noted that, in a second implementation, n pieces of the header information are cascaded, the n data units are cascaded, and the cascaded header information is located before or after the cascaded data units.

In this implementation, the receiving end reads each piece of header information from a preset location of the cascaded header information.

7) When attribute information of some data units is the same and attribute information of some data units is partially the same, the transmitting end generates a data packet of a seventh preset format. Each piece of header information corresponds to s data units, a first identifier in the header information is used to indicate that the header information includes transmission channel information, data length information and the data unit quantity s, and a second identifier in the header information is used to indicate that the header information includes difference information, or, the second identifier is used to indicate that the header information does not include same information. The difference information is determined according to different information in data unit quantities s and attribute information of the data units in different data unit subsets in a same data unit set, and the same information is information in the attribute information and the data unit quantity s other than the difference information. It should be noted that, a total data amount of the first identifier and the second identifier is less than a data amount of the same information indicated by the second identifier.

The data packet includes i data unit sets, each data unit set includes j data unit subsets, each data unit subset includes one piece of header information and s data units corresponding to the header information, where attribute information of data units in a same data unit subset is the same, attribute information of data units in different data unit subsets is partially the same, and a sum of all data unit quantities s is n; i≥1, j≥2, s≥1; where one of j pieces of header information included in each data unit set includes a first identifier, transmission channel information, data length information, and the data unit quantity s, and each of the rest pieces of the head information included in the each data unit set includes a second identifier, difference information and the data unit quantity s.

The difference information is transmission channel information or a data length or a total data length determined according to the data length or the data unit quantity s. Where, when j≥3, the difference information may be obtained by comparison with the header information including the first identifier. For example, a first piece of header information includes the first identifier, an LCID in the first piece of header information is 1, the data length is 2000 bits, and the data unit quantity s is 3; a second piece of header information includes the second identifier, an LCID in the second piece of header information is 2, the data length is 2000 bits, and the data unit quantity s is 3; a third piece of header information includes the second identifier, an LCID in the third piece of header information is 1, the data length is 1000 bits, and the data unit quantity s is 1. Then, compared with the first piece of header information, the difference information in the second piece of header information is the LCID; and compared with the first piece of header information, the difference information in the third piece of header information is the data length and the data unit quantity s. Or, the difference information may be obtained by comparison with a previous piece of header information. The above three pieces of head information are still taken as an example for illustration. Then, compared with the first piece of header information, the difference information in the second piece of header information is the LCID; and compared with the second piece of header information, the difference information in the third piece of header information is the LCID, the data length, and the data unit quantity s.

When j=2, the first identifier and the second identifier may be set, for example, the first identifier is used to indicate that the header information includes the transmission channel information, the data length information and the data unit quantity s, and the second identifier is used to indicate that the difference information included in the header information is the transmission channel information or the data length information, or, the difference information is the transmission channel information and the data unit quantity s, or, the difference information is the transmission channel information and the data length information. In an embodiment, the second identifier is used to indicate that the same information included in the header information is the data length information and the data unit quantity s; or, the same information is the transmission channel information and the data unit quantity s; or, the same information is the data length information; or, the same information is the transmission channel information. The first identifier and the second identifier may be implemented by different values of a flag bit. For example, when a value of the flag bit is 1, it is indicated that the header information includes the first identifier; and when the value of the flag bit is 0, it is indicated that the header information includes the second identifier.

When j≥3, it is also possible to set an identifier for each type of information of the attribute information. For example, the first identifier is used to indicate that the header information includes the transmission channel information, the data length information, and the data unit quantity s, the second identifier is used to indicate that the difference information included in the header information is the transmission channel information, or, that the same information is the data length information and the data unit quantity s; a fourth identifier is used to indicate that the difference information included in the header information is the data length information, or, that the same information is the transmission channel information and the data unit quantity s; a fifth identifier is used to indicate that the difference information included in the header information is the transmission channel information and the data length information, or, that the same information is the data unit quantity s; a sixth identifier is used to indicate that the difference information included in the header information is the transmission channel information and the data unit quantity s, or, that the same information is the data length information, which is not limited in this embodiment. The first identifier, the second identifier, the fourth identifier, the fifth identifier and the sixth identifier may be implemented by different values of a flag bit. For example, when a value of the flag bit is 1, it is indicated that the header information includes the first identifier; when the value of the flag bit is 0, it is indicated that the header information includes the second identifier; when the value of the flag bit is 2, it is indicated that the header information includes the fourth identifier; when the value of the flag bit is 3, it is indicated that the header information includes the fifth identifier; and when the value of the flag bit is 4, it is indicated that the header information includes the sixth identifier.

It should be noted that, a total data amount of the first identifier and the fourth identifier is less than a data amount of the same information indicated by the fourth identifier. Similarly, a total data amount of the first identifier and the fifth identifier is less than a data amount of the same information indicated by the fifth identifier; and a total data amount of the first identifier and the sixth identifier is less than a data amount of the same information indicated by the sixth identifier.

For the header information including the first identifier, when s=1, the header information further includes the attribute information of the data unit and the data unit quantity s; and when s≥2, the header information further includes the transmission channel information of any one of the s data units, the data length information and the data unit quantity s. For the header information including the second identifier, when s=1, the header information further includes the difference information.

This embodiment does not limit the locational relationship between the header information including the first identifier and the pieces of the header information including the second identifier in a data unit set.

There are various manners for the transmitting end to generate the data packet of the seventh preset format, and this embodiment is illustrated in one of the manners: the transmitting end extracts a data unit classification from a data unit/data units that has/have not been extracted in the n data units, where the attribute information of all the data units in the data unit classification is the same; the transmitting end generates one piece of header information including the first identifier, the transmission channel information, the data length information and the data unit quantity s for all the data units in the data unit classification; the transmitting end searches for specific attribute information from attribute information of a data unit/data units that has/have not been extracted, where the specific attribute information is partially the same as the attribute information of any one of the data units in the above data unit classification; when the specific attribute information is found, the transmitting end extracts a respective data unit/respective data units corresponding to the specific attribute information as another data unit classification, generates one piece of header information including the second identifier and the difference information for all the data units in the another data unit classification, and continues the step of searching for specific attribute information from attribute information of a data unit/data units that has/have not been extracted; and when no specific attribute information is found, the transmitting end continues the step of extracting a data unit classification from a data unit/data units that has/have not been extracted in the n data units.

For example, there are 4 data units to be transmitted, attribute information of a data unit 1 and a data unit 2 is the same and is denoted as attribute information 1, attribute information of a data unit 3 is partially the same as the attribute information 1 and is denoted as attribute information 2, and attribute information of a data unit 4 is completely different from that of the attribute information 1 and 2 and is denoted as attribute information 3. Then the transmitting end generates two data unit sets. A first data unit set includes two data unit subsets, where a first data unit subset includes header information and the data unit 1 and the data unit 2, where the header information includes the first identifier, the attribute information 1, and the data unit quantity 2; and a second data unit subset includes header information and the data unit 3, where the header information includes the second identifier and difference information determined according to the attribute information 1, the attribute information 2 and the data unit quantity 2 included in the first data unit subset. A second data unit set includes one data unit subsets, where that data unit set includes header information and the data unit 4, where the header information includes the first identifier, the attribute information 3, and the data unit quantity 1.

After the transmitting end generates the data packet, the step 304 may be replaced with: reading, for each data unit set, header information in each data unit subset in the data unit sets; decapsulating, for each piece of header information, the data units corresponding to the header information according to the transmission channel information, the data length information and the data unit quantity s which are read from the header information, when the header information includes the first identifier; and decapsulating, for each piece of header information, the data units corresponding to the header information according to the difference information read from the header information as well as the header information including the first identifier, when the header information includes the second identifier.

The process of the receiving end decapsulating the data packet subset is divided into two parts. The first part is the receiving end decapsulating the data unit subset in which the header information includes the first identifier. This part is the same as the content of the receiving end decapsulating a data unit set in 1), and will not be described here. The second part is the receiving end decapsulating the data unit subset in which the header information includes the second identifier. For convenience of description, the header information including the first identifier is referred to herein as first header information, and the header information including the second identifier is referred to as second header information. Then the receiving end determines that the second header information includes the difference information according to the second identifier; when the difference information is transmission channel information, the receiving end reads s data units according to the data length information and the data unit quantity s in the first header information, and transmits the s data units to an upper layer entity indicated by the transmission channel information in the second header information; when the difference information is the data length, the receiving end reads s data units according to the data unit quantity s in the first header information and the data length in the second header information, and transmits the s data units to an upper layer entity indicated by the transmission channel information in the first header information; when the difference information is the total data length, the receiving end reads s data units according to the data unit quantity s in the first header information and the total data length in the second header information, and transmits the s data units to the upper layer entity indicated by the transmission channel information in the first header information; when the difference information is the transmission channel and the data unit quantity s, the receiving end reads s data units according to the data length information in the first header information and the data unit quantity s in the second header information, and transmits the s data units to the upper layer entity indicated by the transmission channel information in the second header information; when the difference information is the data length and the data unit quantity s, the receiving end reads s data units according to the data unit quantity s and the data length in the second header information, and transmits the s data units to the upper layer entity indicated by the transmission channel information in the first header information; and when the difference information is the total data length and the data unit quantity s, the receiving end reads s data units according to the data unit quantity s and the total data length in the second header information, and transmits the s data units to the upper layer entity indicated by the transmission channel information in the first header information.

In an embodiment, the receiving end may transmit the read data units to the upper layer entity for processing after all the data units in one data unit subset have been read; and the receiving end may also transmit the read data units to the upper layer entity for processing after all the data units in all the data subsets in one data unit set have been read, which is not limited in this embodiment.

It should be noted that, in a first implementation, the i data unit sets are cascaded, the j data unit subsets are cascaded, and the header information in each data unit subset is located before the s data units corresponding to the header information. In this implementation, the receiving end reads the header information of the data unit subset from an initial location of each data unit subset. For the related description of this part, please refer to the description for 2), which will not be repeated herein.

It should be noted that, in a second implementation, q pieces of the header information are cascaded, the n data units are cascaded, the cascaded header information is located before or after the cascaded data units, where q is a sum of data unit subset quantities j for the i data unit sets. In this implementation, the receiving end reads each piece of header information from a preset location of the cascaded header information. For the related description of this part, please refer to the description for 2), which will not be repeated herein.

8) When attribute information of some data units is the same and attribute information of some data units is partially the same, the transmitting end generates a data packet of an eighth preset format. Each piece of header information corresponds to s data units, a first flag bit in packet head information is used to indicate that each piece of header information includes transmission channel information, data length information and the data unit quantity s, or, the first flag bit in the packet head information is used to indicate that each piece of header information includes difference information. Where, the description of the difference information is detailed in the description for 7). It should be noted that, a data amount of the first flag bit is less than a data amount of the same information indicated by the first flag bit.

The data packet includes packet head information and i data unit sets, each data unit set includes j data unit subsets, each data unit subset includes one piece of header information and s data units corresponding to the header information, where attribute information of data units in a same data unit subset is the same, attribute information of data units in different data unit subsets is partially the same, and a sum of all data unit quantities s is n; i≥1, j≥2, s≥1; where one of j pieces of header information included in each data unit set includes transmission channel information, data length information, and the data unit quantity s, and each of the rest pieces of the head information included in the each data unit set includes difference information.

The first flag bit may indicate, by different values, that each piece of header information includes the transmission channel information, the data length information and the data unit quantity s, or that each piece of header information includes the difference information. For example, when a value of the first flag bit is 1, it is indicated that the header information includes the transmission channel information, the data length information and the data unit quantity s; and when the value of the first flag bit is 0, it is indicated that the header information includes the difference information.

There are various manners for the transmitting end to generate the data packet of the eighth preset format, and this embodiment is illustrated in one of the manners: the transmitting end extracts a data unit classification from a data unit/data units that has/have not been extracted in the n data units, where the attribute information of all the data units in the data unit classification is the same; the transmitting end generates one piece of header information including the transmission channel information, the data length information and the data unit quantity s for all the data units in the data unit classification, and sets the first flag bit corresponding to the header information in the packet head information to indicate that the header information includes the transmission channel information, the data length information and the data unit quantity s; the transmitting end searches for specific attribute information from attribute information of a data unit/data units that has/have not been extracted, where the specific attribute information is partially the same as the attribute information of any one of the data units in the above data unit classification; when the specific attribute information is found, the transmitting end extracts a respective data unit/respective data units corresponding to the specific attribute information as another data unit classification, generates one piece of header information including the difference information for all the data units in the another data unit classification, sets the first flag bit corresponding to the header information in the packet head information to indicate that the header information includes the difference information, and continues the step of searching for specific attribute information from attribute information of a data unit/data units that has/have not been extracted; and when no specific attribute information is found, the transmitting end continues the step of extracting a data unit classification from a data unit/data units that has/have not been extracted in the n data units.

For example, there are four data units to be transmitted, attribute information of a data unit 1 and a data unit 2 is the same and is denoted as attribute information 1, attribute information of a data unit 3 is partially the same as the attribute information 1 and is denoted as attributed information 2, and attribute information of a data unit 4, which is denoted as attribute information 3, is completely different from the attribute information 1 and 2. Then the transmitting end generates two data unit sets. A first data unit set includes two data unit subsets, where a first data unit subset includes header information and the data unit 1 and the data unit 2, where the header information includes the attribute information 1 and the data unit quantity 2, a value of a first flag bit corresponding to the header information in the packet information is 1; and a second data unit subset includes header information and the data unit 3, where the header information includes the second identifier and difference information determined according to the attribute information 1, the attribute formation 2 and the data unit quantity 2, and a value of a first flag bit corresponding to the header information in the packet head information is 0. A second data unit set includes one data unit subset including header information and the data unit 4, where the header information includes the first identifier, the attribute information 3, and the data unit quantity 1, and a value of the first flag bit corresponding to the header information in the packet head information is 1.

After the transmitting end generates the data packet, the step 304 may be replaced with: reading a first flag bit corresponding to each piece of header information in the packet head information; reading, for each data unit set, header information in each data unit subset in the data unit sets; decapsulating, for each piece of header information, the data units corresponding to the header information according to the transmission channel information, the data length information and the data unit quantity s which are read from the header information, when the first flag bit corresponding to the header information indicates that the header information includes the transmission channel information, the data length information, and the data unit quantity s; and decapsulating, for each piece of header information, the data units corresponding to the header information according to the difference information read from the header information as well as the header information corresponding to the first flag bit that is used to indicate that the header information includes the transmission channel information, the data length information and the data unit quantity s, when the first flag bit corresponding to the header information indicates that the header information includes the difference information.

The process of the receiving end decapsulating the data packet of the eighth preset format is similar as the process of the receiving end decapsulating the data packet of the seventh preset format, and the difference lies in that, when decapsulating the data packet of the eighth preset format, the receiving end determines which information is included in the header information according to the first flag bit corresponding to the header information in the packet head information, and when decapsulating the data packet of the seventh preset format, the receiving end determines which information is included in the header information according to the first identifier or the second identifier in the header information. The process of decapsulating the data packet of the eighth preset format will not be repeated herein.

It should be noted that, in a first implementation, the i data unit sets are cascaded, the j data unit subsets are cascaded, the header information in each data unit subset is located before the s data units corresponding to the header information, and the packet head information is located before or after the cascaded data unit sets. In this implementation, the receiving end reads the header information of the data unit subset from an initial location of each data unit subset. For the related description of this part, please refer to the description for 3), which will not be repeated herein.

It should be noted that, in a second implementation, q pieces of the header information are cascaded, the n data units are cascaded, the cascaded header information is located before or after the cascaded data units, and the packet head information is located before the cascaded header information or after the cascaded data units, where q is a sum of data unit subset quantities j for the i data unit sets. In this implementation, the receiving end reads each piece of header information from a preset location of the cascaded header information. For the related description of this part, please refer to the description for 3), which will not be repeated herein.

The following are apparatus embodiments of the present disclosure. For the parts that are not elaborated in the apparatus embodiments, reference may be made to the technical details disclosed in the foregoing method embodiments.

Referring to FIG. 20, FIG. 20 illustrates a schematic structural diagram of a data transmission apparatus according to an embodiment of the present disclosure. The data transmission apparatus can be implemented as all or part of a transmitting end by software, hardware, and a combination of both. The data transmission apparatus includes: a generating unit 2001 and a transmitting unit 2002;

the generating unit 2001 is configured to perform the step 301; and the transmitting unit 2002 is configured to perform the step 302.

Referring to FIG. 21, FIG. 21 illustrates a schematic structural diagram of a data transmission apparatus according to an embodiment of the present disclosure. The data transmission apparatus can be implemented as all or part of a receiving end by software, hardware, and a combination of both. The data transmission apparatus includes: a receiving unit 2101 and a decapsulating unit 2102;

the receiving unit 2101 is configured to perform the step 303; and the decapsulating unit 2102 is configured to perform the step 304.

Figure 22:
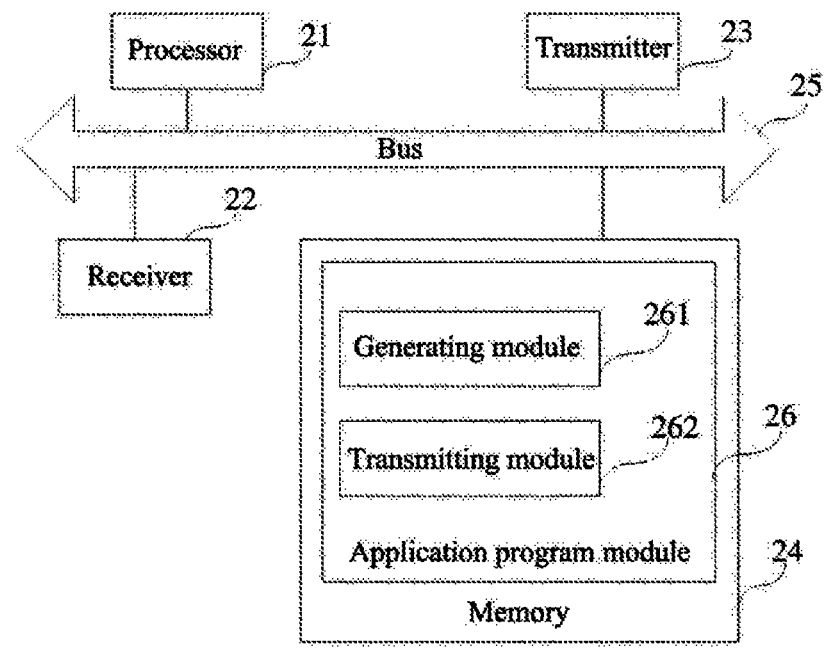
FIG. 22 is a structural block diagram of a transmitting end according to another embodiment of the present invention.

Referring to FIG. 22, which is a schematic structural diagram of a transmitting end according to an example embodiment of the present disclosure, the transmitting end includes a processor 21, a receiver 22, a transmitter 23, a memory 24, and a bus 25.

The processor 21 includes one or more processing cores, and the processor 21 executes various functional applications and information processing by running a software program and a module.

The receiver 22 and the transmitter 23 may be implemented as a communication component. The communication component may be a communication chip. The communication chip may include a receiving module, a transmitting module, a modem module, etc., where the communication chip is configured to modulate and/or demodulate information, and receive or send the information via a wireless signal.

The memory 24 is connected to the processor 21 via the bus 25.

The memory 24 can be configured to store a software program and a module.

The memory 24 can store an application program module 26 according to at least one function. The application program module 26 can include a generating module 261 and a transmitting module 262.

The processor 21 is configured to execute the generating module 261 to implement the function of the steps of generating the data packet of the preset format in the foregoing various embodiments; and the processor 21 is configured to execute the transmitting module 262 to implement the function of the steps of transmitting in the foregoing various embodiments.

Moreover, the memory 24 may be implemented by any type of volatile or non-volatile memory device, or a combination thereof, such as a static random access memory (SRAM), an electrically erasable programmable read only memory (EEPROM), an electrically programmable read only memory (EPROM), a programmable read only memory (PROM), a read only memory (ROM), a magnetic memory, a flash Memory, a disk or an optical Disk.

Figure 23:
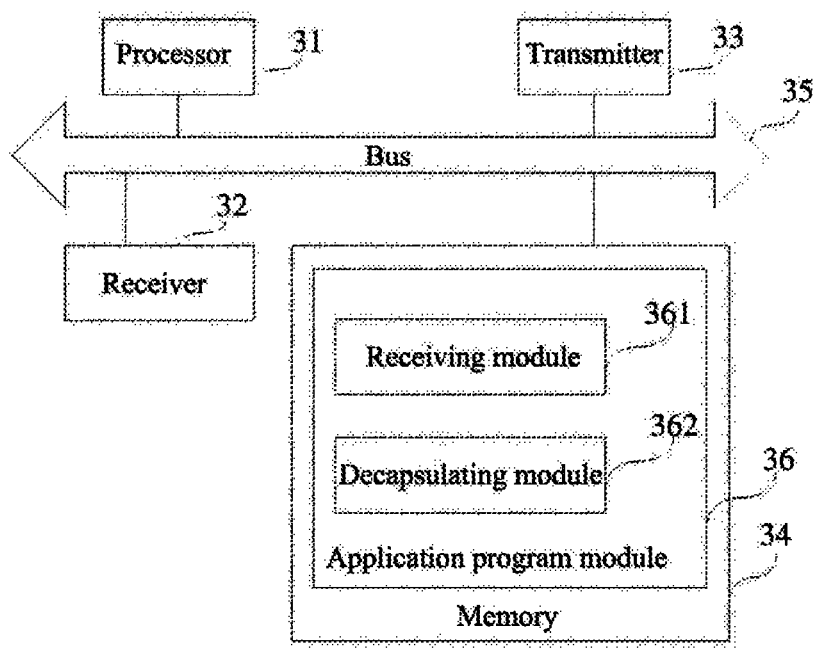
FIG. 23 is a structural block diagram of a receiving end according to another embodiment of the present invention.

Referring to FIG. 23, which is a schematic structural diagram of a receiving end according to an example embodiment of the present disclosure, the receiving end includes a processor 31, a receiver 32, a transmitter 33, a memory 34, and a bus 35.

The processor 31 includes one or more processing cores, and the processor 31 executes various functional applications and information processing by running a software program and a module.

The receiver 32 and the transmitter 33 may be implemented as a communication component. The communication component may be a communication chip. The communication chip may include a receiving module, a transmitting module, a modem module, etc., where the communication chip is configured to modulate and demodulate information, and receive or send the information via a wireless signal.

The memory 34 is connected to the processor 31 via the bus 35.

The memory 34 can be configured to store a software program and a module.

The memory 34 can store an application program module 36 according to at least one function. The application program module 36 can include a receiving module 361 and a decapsulating module 362.

The processor 21 is configured to execute the receiving module 361 to implement the function of the steps of receiving in the foregoing various embodiments; the processor 21 is configured to execute the decapsulating module 362 to implement the function of the steps of decapsulating the data packet of the preset format in the foregoing various embodiments.

Moreover, the memory 34 may be implemented by any type of volatile or non-volatile memory device, or a combination thereof, such as a static random access memory (SRAM), an electrically erasable programmable read only memory (EEPROM), an electrically programmable read only memory (EPROM), a programmable read only memory (PROM), a read only memory (ROM), a magnetic memory, a flash Memory, a disk or an optical Disk.

An embodiment of the present disclosure further provides a data transmission system, which can include a transmitting end and a receiving end.

The transmitting end can include the data transmission apparatus according to FIG. 20, and the receiving end can include the data transmission apparatus according to FIG. 21.

Or, the transmitting end can be the transmitting end according to FIG. 22, and the receiving end can be the receiving end according to FIG. 23.

Those skilled in the art should appreciate that in one or more of the above examples, the functions described in the embodiments of the present disclosure may be implemented in hardware, software, firmware, or any combination thereof. When implemented in software, the functions may be stored in a computer readable medium or transmitted as one or more instructions or code on a computer readable medium. The computer readable medium includes a computer storage medium and a communication medium, where the communication medium includes any medium that facilitates transfer of a computer program from one location to another. The storage medium may be any available media that can be accessed by a general purpose or a special purpose computer.

The above are only the preferred embodiments of the present disclosure, and are not intended to limit the present disclosure. Any modifications, substitutions, improvements, etc., which are within the spirit and principle of the present disclosure, should be included in the protection scope of the present disclosure.

What is claimed is:

1. A data transmission method, comprising:
   generating a data packet of a preset format according to n data units and attribute information of each data unit, wherein the attribute information comprises transmission channel information and a data length of the each data unit, n≥2; and
   transmitting the data packet to a receiving end, wherein the data packet comprises header information and the n data units, and at least one piece of the header information is generated according to same information in attribute information of at least two of the data units;
   wherein the data packet comprises i data unit sets, each data unit set comprises j data unit subsets, each data unit subset comprises one piece of header information and s data units corresponding to the header information, wherein attribute information of the data units in a same data unit subset is the same, attribute information of data units in different data unit subsets is partially the same, and a sum of all data unit quantities s is n; i≥1, j≥2, s≥1;
   wherein one of i pieces of header information comprised in each data unit set comprises a first identifier, the transmission channel information, data length information and a data unit quantity s, and each of the rest pieces of the header information comprised in the each data unit set comprises a second identifier and difference information, wherein the data length information is a data length of one of the data units or a total data length of the s data units;
   the first identifier in the header information is used to indicate that the header information comprises the transmission channel information, the data length information and the data unit quantity s; the second identifier in the header information is used to indicate that the header information comprises the difference information;
   wherein the difference information is determined according to different information in data unit quantities s and attribute information of data units in different data unit subsets in a same data unit set.

2. The method according to claim 1, wherein,
   the i data unit sets are cascaded, the j data unit subsets are cascaded, and the header information in each data unit subset is located before the s data units corresponding to the header information;
   or,
   q pieces of the header information are cascaded, the n data units are cascaded, and the cascaded header information is located before or after the cascaded data units, wherein q is a sum of data unit subset quantities j for the i data unit sets.

3. The method according to claim 2, wherein the cascaded header information is located before the cascaded data unit sets, the data packet further comprises packet head information,
   the packet head information comprises an initial location of a first piece of header information, and a length of each piece of header information is preset, or, the packet head information comprises an initial location of a first piece of header information and a length of each piece of header information, wherein each piece of header information further comprises a second flag bit, the second flag bit is used to indicate that what is encapsulated in a data block immediately after the header information is header information, or, the second flag bit is used to indicate that what is encapsulated in a data block immediately after the header information is a data unit;
   or,
   the packet head information comprises an initial location of a first piece of header information and a quantity of piece of header information, and a length of each piece of header information is preset, or, the packet head information comprises an initial location of a first piece of header information, a quantity of piece of header information, and a length of each piece of header information;
   or,
   the packet head information comprises an initial location of a first piece of header information and an end location of a last piece of header information, and a length of each piece of header information is preset, or, the packet head information comprises an initial location of a first piece of header information, an end location of a last piece of header information and a length of each piece of header information;
   or,
   the packet head information comprises an initial location and a third flag bit of each data block, wherein the third flag bit is used to indicate that what is encapsulated in the each data block is header information; or, the third flag bit is used to indicate that what is encapsulated in the each data block is a data unit.

4. The method according to claim 2, wherein the cascaded header information is located after the cascaded data unit sets, the data packet further comprises packet head information, the packet head information comprises a preset location, and a length of each piece of header information is preset, or, the packet head information comprises a preset location and a length of each piece of header information, wherein the preset location is an initial location or an end location of a last piece of header information, and the header information further comprises a fourth flag bit, wherein the fourth flag bit is used to indicate that what is encapsulated in a data block immediately before the header information is header information, or, the fourth flag bit is used to indicate that what is encapsulated in a data block immediately before the header information is a data unit;

or, the packet head information comprises a preset location and a quantity of piece of header information, and a length of each piece of header information is preset, or, the packet head information comprises a preset location, a quantity of piece of header information and a length of each piece of header information, wherein the preset location is an initial location or an end location of a last piece of header information;

or, the packet head information comprises an initial location of a first piece of header information and an end location of a last piece of header information, and a length of each piece of header information is preset, or, the packet head information comprises an initial location of a first piece of header information, an end location of a last piece of header information and a length of each piece of header information;

or, the packet head information comprises an initial location and a fifth flag bit of each data block, wherein the fifth flag bit is used to indicate that what is encapsulated in the each data block is header information; or, the fifth flag bit is used to indicate that what is encapsulated in the each data block is a data segment.

5. The method according to claim 1, wherein the generating a data packet of a preset format according to n data units and attribute information of each data unit comprises:

generating the data packet of the preset format according to the n data units and the attribute information of each data unit, when preset information in attribute information of the n data units is a preset value.

6. The method according to claim 1, wherein the data packet further comprises packet head information, wherein a sixth flag bit is provided in the packet head information, and the sixth flag bit is used to indicate whether the data packet is of the preset format.

7. A transmitting end, wherein the transmitting end comprises: a processor and a transmitter;

the processor is configured to generate a data packet of a preset format according to n data units and attribute information of each data unit, wherein the attribute information comprises transmission channel information and a data length of the each data unit, n≥2; and the transmitter is configured to transmit the data packet to a receiving end, wherein the data packet comprises header information and the n data units, and at least one piece of the header information is generated according to same information in attribute information of at least two of the data units;

wherein the data packet comprises i data unit sets, each data unit set comprises i data unit subsets, each data unit subset comprises one piece of header information and s data units corresponding to the header information, wherein attribute information of the data units in a same data unit subset is the same, attribute information of data units in different data unit subsets is partially the same, and a sum of all data unit quantities s is n; i≥1, j≥2, s≥1;

wherein one of i pieces of header information comprised in each data unit set comprises a first identifier, the transmission channel information, data length information, and a data unit quantity s, and each of the rest pieces of the header information comprised in the each data unit set comprises a second identifier, difference information and a data unit quantity s, wherein the data length information is a data length of one of the data units or a total data length of the s data units;

the first identifier in the header information is used to indicate that the header information comprises the transmission channel information and the data length information; the second identifier in the header information is used to indicate that the header information comprises the difference information;

wherein the difference information is determined according to different information in attribute information of data units in different data unit subsets in a same data unit set.

8. The transmitting end according to claim 7, wherein, the i data unit sets are cascaded, the j data unit subsets are cascaded, and the header information in each data unit subset is located before the s data units corresponding to the header information;

or, q pieces of the header information are cascaded, the n data units are cascaded, and the cascaded header information is located before or after the cascaded data units, wherein q is a sum of data unit subset quantities j for the i data unit sets.

9. The transmitting end according to claim 8, wherein the cascaded header information is located before the cascaded data unit sets, and the data packet further comprises packet head information, the packet head information comprises an initial location of a first piece of header information, and a length of each piece of header information is preset, or, the packet head information comprises an initial location of a first piece of header information and a length of each piece of header information, wherein each piece of header information further comprises a second flag bit, the second flag bit is used to indicate that what is encapsulated in a data block immediately after the header information is header information, or, the second flag bit is used to indicate that what is encapsulated in a data block immediately after the header information is a data unit;

or, the packet head information comprises an initial location of a first piece of header information and a quantity of piece of header information, and a length of each piece of header information is preset, or, the packet head information comprises an initial location of a first piece of header information, a quantity of piece of header information and a length of each piece of header information;

or, the packet head information comprises an initial location of a first piece of header information and an end location of a last piece of header information, and a length of each piece of header information is preset, or, the packet head information comprises an initial location of a first piece of header information, an end location of a last piece of header information and a length of each piece of header information;

or, the packet head information comprises an initial location and a third flag bit of each data block, wherein the third flag bit is used to indicate that what is encapsulated in the each data block is header information, or, the third flag bit is used to indicate that what is encapsulated in the each data block is a data unit.

10. The transmitting end according to claim 8, wherein the cascaded header information is located after the cascaded data unit sets, and the data packet further comprises packet head information, the packet head information comprises a preset location, and a length of each piece of header information is preset, or, the packet head information comprises a preset location and a length of each piece of header information, wherein the preset location is an initial location or an end location of a last piece of header information, and the header information further comprises a fourth flag bit, wherein the fourth flag bit is used to indicate that what is encapsulated in a data block immediately before the header information is header information, or, the fourth flag bit is used to indicate that what is encapsulated in a data block immediately before the header information is a data unit;

or, the packet head information comprises a preset location and a quantity of piece of header information, and a length of each piece of header information is preset, or, the packet head information comprises a preset location, a quantity of piece of header information and a length of each piece of header information, wherein the preset location is an initial location or an end location of a last piece of header information;

or, the packet head information comprises an initial location of a first piece of header information and an end location of a last piece of header information, and a length of each piece of header information is preset, or, the packet head information comprises an initial location of a first piece of header information, an end location of a last piece of header information and a length of each piece of header information;

or, the packet head information comprises an initial location and a fifth flag bit of each data block, wherein the fifth flag bit is used to indicate that what is encapsulated in the each data block is header information; or, the fifth flag bit is used to indicate that what is encapsulated in the each data block is a data segment.

11. The transmitting end according to claim 7, wherein the processor is specifically configured to:

generate the data packet of the preset format according to the n data units and the attribute information of each data unit, when preset information in attribute information of the n data units is a preset value.

12. The transmitting end according to claim 7, wherein the data packet further comprises packet head information, wherein a sixth flag bit is provided in the packet head information, and the sixth flag bit is used to indicate whether the data packet is of the preset format.

13. A receiving end, wherein the receiving end comprises: a receiver and a processor;

the receiver is configured to receive a data packet of a preset format transmitted by a transmitting end, wherein the data packet comprises header information and n data units, and at least one piece of the header information is generated according to same information in attribute information of at least two of the data units, wherein the attribute information comprises transmission channel information and a data length of a data unit, n≥2; and the processor is configured to decapsulate the data packet received by the receiver;

wherein the data packet comprises packet head information and i data unit sets, each data unit set comprises i data unit subsets, each data unit subset comprises one piece of header information and s data units corresponding to the header information, wherein attribute information of the data units in a same data unit subset is the same, attribute information of data units in different data unit subsets is partially the same, and a sum of all data unit quantities s is n; i≥1, j≥2, s≥1;

the processor is specifically configured to:

read a first flag bit corresponding to each piece of header information in the packet head information;

read, for each data unit set, the header information in each data unit subset in the each data unit set;

decapsulate, for each piece of third header information, the data units corresponding to the third header information according to the transmission channel information, data length information and a data unit quantity s which are read from the third header information, when the first flag bit corresponding to the third header information indicates that third the header information comprises the transmission channel information and the data length information; wherein the data length information is a data length of one of the data units or a total data length of the s data units; and decapsulate, for each piece of fourth header information, the data units corresponding to the fourth header information according to difference information and a data unit quantity s which are read from the fourth header information as well as the third header information corresponding to the first flag bit that is used to indicate that the third header information comprises the transmission channel information and the data length information, when the first flag bit corresponding to the fourth header information indicates that the fourth header information comprises the difference information; wherein the difference information is determined according to different information in attribute information of data units in different data unit subsets in a same data unit set.

14. The receiving end according to claim 13, wherein the processor is further configured to:

read the header information in each data unit subset from an initial location of the each data unit subset, when the i data unit sets are cascaded, the j data unit subsets are cascaded, the header information in each data unit subset is located before the s data units corresponding to the header information, and the packet head information is located before or after the cascaded data unit sets; and read each piece of header information from a preset location of cascaded header information, when q pieces of the header information are cascaded, the n data units are cascaded, the cascaded header information is located before or after the cascaded data units, and the packet head information is located before the cascaded header information or after the cascaded data units, wherein q is a sum of data unit subset quantities j for the i data unit sets.

15. The receiving end according to claim 14, wherein the cascaded header information is located before the cascaded data unit sets, and the data packet further comprises packet head information, the processor is further configured to:

read an initial location of a first piece of header information in the packet head information, and sequentially read each piece of header information from the initial location according to a preset length of each piece of header information or a length of each piece of header information in the packet head information, until it is determined according to a second flag bit in the header information that what is encapsulated in a data block immediately after the header information is a data unit;

or, read an initial location of a first piece of header information in the packet head information, and sequentially read each piece of header information from the initial location according to a preset length of each piece of header information or a length of each piece of header information in the packet head information, until a quantity of piece of the read header information reaches the quantity of piece of header information;

or, read an initial location of a first piece of header information in the packet head information, and sequentially read each piece of header information from the initial location according to a preset length of each piece of header information or a length of each piece of header information in the packet head information, until a read location is an end location of a last piece of header information;

or, read an initial location and a third flag bit of each data block in the packet head information, and when the third flag bit indicates that what is encapsulated in a corresponding data block is header information, read the header information.

16. The receiving end according to claim 14, wherein the cascaded header information is located after the cascaded data unit sets, and the data packet further comprises packet head information, the processor is further configured to:

read a preset location in the packet head information, and sequentially read each piece of header information from the preset location according to a preset length of each piece of header information or a length of each piece of header information in the packet head information, until it is determined according to a fourth flag bit in the header information that what is encapsulated in a data block immediately before the header information is a data unit, wherein the preset location is an initial location or an end location of a last piece of header information;

or, read a preset location in the packet head information, and sequentially read each piece of header information from the preset location according to a preset length of each piece of header information or a length of each piece of header information in the packet head information, until a quantity of piece of the read header information reaches the quantity of piece of header information, wherein the preset location is an initial location or an end location of a last piece of header information;

or, read an initial location of a first piece of header information in the packet head information, and sequentially read each piece of header information from the initial location according to a preset length of each piece of header information or a length of each piece of header information in the packet head information, until a read location is an end location of a last piece of header information;

or, read an initial location and a fifth flag bit of each data block in the packet head information, and when the fifth flag bit indicates that what is encapsulated in a corresponding data block is header information, read the header information.

17. The receiving end according to claim 13, wherein the receiver is specifically configured to:

determine that the data packet of the preset format transmitted by the transmitting end is received, when preset information in attribute information of the n data units is a preset value.

* * * * *